United States Patent
Machida

(10) Patent No.: US 10,163,060 B2
(45) Date of Patent: Dec. 25, 2018

(54) HIERARCHICAL PROBABILITY MODEL GENERATION SYSTEM, HIERARCHICAL PROBABILITY MODEL GENERATION METHOD, AND PROGRAM

(71) Applicant: NEC Corporation, Tokyo (JP)

(72) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 381 days.

(21) Appl. No.: 14/400,074

(22) PCT Filed: Apr. 4, 2013

(86) PCT No.: PCT/JP2013/060327
§ 371 (c)(1),
(2) Date: Nov. 10, 2014

(87) PCT Pub. No.: WO2013/168495
PCT Pub. Date: Nov. 14, 2013

(65) Prior Publication Data
US 2015/0120640 A1 Apr. 30, 2015

(30) Foreign Application Priority Data
May 10, 2012 (JP) ................................ 2012-108645

(51) Int. Cl.
*G06N 7/00* (2006.01)
*G06F 11/00* (2006.01)
*G05B 23/02* (2006.01)

(52) U.S. Cl.
CPC ........... *G06N 7/005* (2013.01); *G06F 11/008* (2013.01); *G05B 23/0248* (2013.01)

(58) Field of Classification Search
CPC .................................................. G06N 99/005
See application file for complete search history.

(56) References Cited

U.S. PATENT DOCUMENTS

2003/0172150 A1* 9/2003 Kennedy ............... H04L 41/069
709/224
2008/0065928 A1* 3/2008 Suzuki ................ G06F 11/0709
714/3

FOREIGN PATENT DOCUMENTS

JP    2000-194561    7/2000
JP    2007-122639    5/2007
(Continued)

OTHER PUBLICATIONS

S. Russell and P. Norvig, Artificial Intelligence: A Modern Approach, 2nd Ed., 2003, pp. 462-789.*
(Continued)

*Primary Examiner* — Vincent Gonzales
(74) *Attorney, Agent, or Firm* — Finnegan, Henderson, Farabow, Garrett & Dunner, L.L.P.

(57) ABSTRACT

A hierarchical probability model capable of improving the performance and reliability of an availability analysis in a large and complex system is efficiently generated.
A hierarchical probability model generation system includes: an independent event analysis unit that specifies independent events about operating conditions of a system on the basis of availability requirements of the system and configuration information of the system, the independent events being calculable independently of each other; an event tree generation unit that generates an event tree using the independent events; and a state transition model generation unit that generates state transition models used to calculate occurrence probabilities of the independent events.

19 Claims, 22 Drawing Sheets

(56) References Cited

FOREIGN PATENT DOCUMENTS

| | | |
|---|---|---|
| JP | 2007-257184 | 10/2007 |
| JP | 2010-181212 | 8/2010 |
| JP | 2010-237855 | 10/2010 |
| JP | 2011-175504 | 9/2011 |

OTHER PUBLICATIONS

J.R. Quinlan, "Induction of Decision Trees", Mach. Learn. vol. 1, pp. 81-106, 1986.*
International Search Report dated Jun. 11, 2013 in corresponding PCT International Application.

* cited by examiner

Fig. 14

AVAILABILITY REQUIREMENTS OF THREE-TIER WEB APPLICATION SYSTEM

| FUNCTION | NUMBER OF REQUIRED PROCESSES | FAILURE-RESISTANT DESIGN |
|---|---|---|
| LOAD BALANCING FUNCTION(LB) | 1 | |
| WEB FUNCTION(Web) | 1 | TWO REDUNDANT PROCESSES |
| APPLICATION FUNCTION(AP) | 1 | TWO REDUNDANT PROCESSES |
| DATABASE FUNCTION(DB) | 1 | |

HIERARCHICAL PROBABILITY MODEL GENERATION SYSTEM, HIERARCHICAL PROBABILITY MODEL GENERATION METHOD, AND PROGRAM

CROSS-REFERENCE TO RELATED PATENT APPLICATIONS

This application is a National Stage Entry of International Application No. PCT/JP2013/060327, filed Apr. 4, 2013, which claims priority from Japanese Patent Application No. 2012-108645, filed May 10, 2012. The entire contents of the above-referenced applications are expressly incorporated herein by reference.

BACKGROUND

The present invention relates to a hierarchical probability model generation system, a hierarchical probability model generation method, and a program.

As one of methods for analyzing the reliability and availability of systems, an analysis method using a fault tree has been widely used (for example, Patent Document 1). In a fault tree, the failure event of a system is defined as a top event, events causing the occurrence of the top event are listed as basic events, and the top event is expressed by the combinational logic of the basic events. For the combination of basic events, an AND gate corresponding to a logical product, an OR gate corresponding to a logical sum, a k-out-of-n gate that produces an output when k out of n events occur, or the like is used. Provided that the occurrence probabilities of basic events are obtained, the occurrence probability of a top event can be found by repeatedly performing a calculation corresponding to the type of each gate.

The basic analysis of a fault tree is based on the premise that input basic events are independent of each other. When dependence exists between basic events, it is required to find the occurrence probabilities of the basic events considering the dependence to perform an analysis. For example, consideration is given to a case in which two basic events b and c simultaneously occur due to an event a not included in a fault tree. When the occurrence probability of the event a is expressed as P(a), both P(b) and P(c) include P(a). Accordingly, an analysis process using P(b) and P(c) may redundantly consider the influence of P(a), whereby the occurrence probability of a top event cannot be correctly found.

In order to correctly find the availability of a system having much dependence, it is required to perform modeling and an analysis using a state space model. For example, the state transition of a system is modeled by a continuous-time Markov chain (CTMC) and the CTMC is analyzed, whereby the probability of the system in its operating state can be found. Unlike a fault tree, a state space model such as the CTMC allows modeling considering various dependence. However, when a system to be analyzed is large and complex, a state space model faces the problem of state explosion. It becomes difficult to correctly perform the modeling and analysis of a system.

In order to address this, there has been proposed a method for analyzing availability using a hierarchical probability model in which the advantages of a fault tree (an event tree in a broad sense) and a state space model are combined together (for example, Non-Patent Document 1). A state space model is defined for each of basic events as the inputs of a fault tree, and a result obtained by analyzing the state space models is input to the fault tree to find the occurrence probability of a top event. The state space models are applied only to parts having the dependence therebetween, whereby an analysis result can be correctly found and the problem of state explosion can be reduced.

When a system is complex and large, it becomes difficult to generate a model for analyzing availability. In order to address this, there has been employed a method for automatically generating a fault tree and a state space model on the basis of the configuration information and availability requirements of a system.

Patent Document 1: Patent Publication JP-A-2007-122639

Patent Document 2: Patent Publication JP-A-2010-237855

Non-Patent Document 1: K. S. Trivedi, D. Wang, D. J. Hunt, A. Rindos, W. E. Smith, B. Vashaw, "Availability Modeling of SIP Protocol on IBM Web Sphere," Proc. of PRDC 2008.

Non-Patent Document 2: F. Machida, E. Andrade, D. Kim and K. Trivedi, "Candy: Component-based Availability Modeling Framework for Cloud Service Management Using SysML", In Proc. of 30th IEEE International Symposium on Reliable Distributed Systems (SRDS), pp. 209-218, 2011.

SUMMARY

As described above, in order to realize an improvement in the performance (speed-up) and reliability of an availability analysis in a large and complex system, it is effective to use a hierarchical probability model in which the respective advantages of a fault tree and a state space model are combined together. By the methods described in Patent Document s 1 and 2 and Non-Patent Documents 1and 2, however, a hierarchical probability model cannot be efficiently generated.

Accordingly, it is an exemplary object of the present invention to efficiently generate a hierarchical probability model capable of improving the performance and reliability of an availability analysis in a large and complex system.

A hierarchical probability model generation system according to the present invention includes: an independent event analysis unit that specifies independent events about operating conditions of a system on the basis of availability requirements of the system and configuration information of the system, the independent events being calculable independently of each other; an event tree generation unit that generates an event tree using the independent events; and a state transition model generation unit that generates state transition models used to calculate occurrence probabilities of the independent events.

A hierarchical probability model generation system according to the present invention includes: an operating conditions analysis unit that generates a temporary event tree by analyzing operating conditions of a system from availability requirements of the system; a temporary state transition model generation unit that generates, on the basis of configuration information of the system, temporary state transition models expressing behaviors of configuration elements of the system; an independent event determination unit that determines independent basic events on the basis of the temporary event tree and the temporary state transition models; an event tree generation unit that generates an event tree using the independent basic events; and an independent basic event state definition unit that specifies a state on a corresponding state transition model for each of the independent basic events and updates the temporary state transition models.

A hierarchical probability model generation method according to the present invention includes the steps of: specifying independent events about operating conditions of a system on the basis of availability requirements of the system and configuration information of the system, the independent events being calculable independently of each other; generating an event tree using the independent events; and generating state transition models used to calculate occurrence probabilities of the independent events.

A hierarchical probability model generation method according to the present invention includes the steps of: generating a temporary event tree by analyzing operating conditions of a system from availability requirements of the system; generating, on the basis of configuration information of the system, temporary state transition models expressing behaviors of configuration elements of the system; an independent event determination unit that determines independent basic events on the basis of the temporary event tree and the temporary state transition models; generating an event tree using the independent basic events; and specifying a state on a corresponding state transition model for each of the independent basic events and updating the temporary state transition models.

A program according to the present invention causes a computer to function as: an independent event analysis unit that specifies independent events about operating conditions of a system on the basis of availability requirements of the system and configuration information of the system, the independent events being calculable independently of each other; an event tree generation unit that generates an event tree using the independent events; and a state transition model generation unit that generates state transition models used to calculate occurrence probabilities of the independent events.

A program according to the present invention causes a computer to function as: an operating conditions analysis unit that generates a temporary event tree by analyzing operating conditions of a system from availability requirements of the system; a temporary state transition model generation unit that generates, on the basis of configuration information of the system, temporary state transition models expressing behaviors of configuration elements of the system; an independent event determination unit that determines independent basic events on the basis of the temporary event tree and the temporary state transition models; an event tree generation unit that generates an event tree using the independent basic events; and an independent basic event state definition unit that specifies a state on a corresponding state transition model for each of the independent basic events and updates the temporary state transition models.

According to an exemplary aspect of the present invention, it is possible to efficiently generate a hierarchical probability model capable of improving the performance and reliability of an availability analysis in a large and complex system.

DESCRIPTION OF DRAWINGS

FIG. 14 is a table illustrating availability requirements according to an example of the present invention.

EXEMPLARY EMBODIMENT

First Embodiment

Next, an embodiment for carrying out the present invention will be described in detail with reference to the drawings.

[Description of Configuration]

Figure 1:
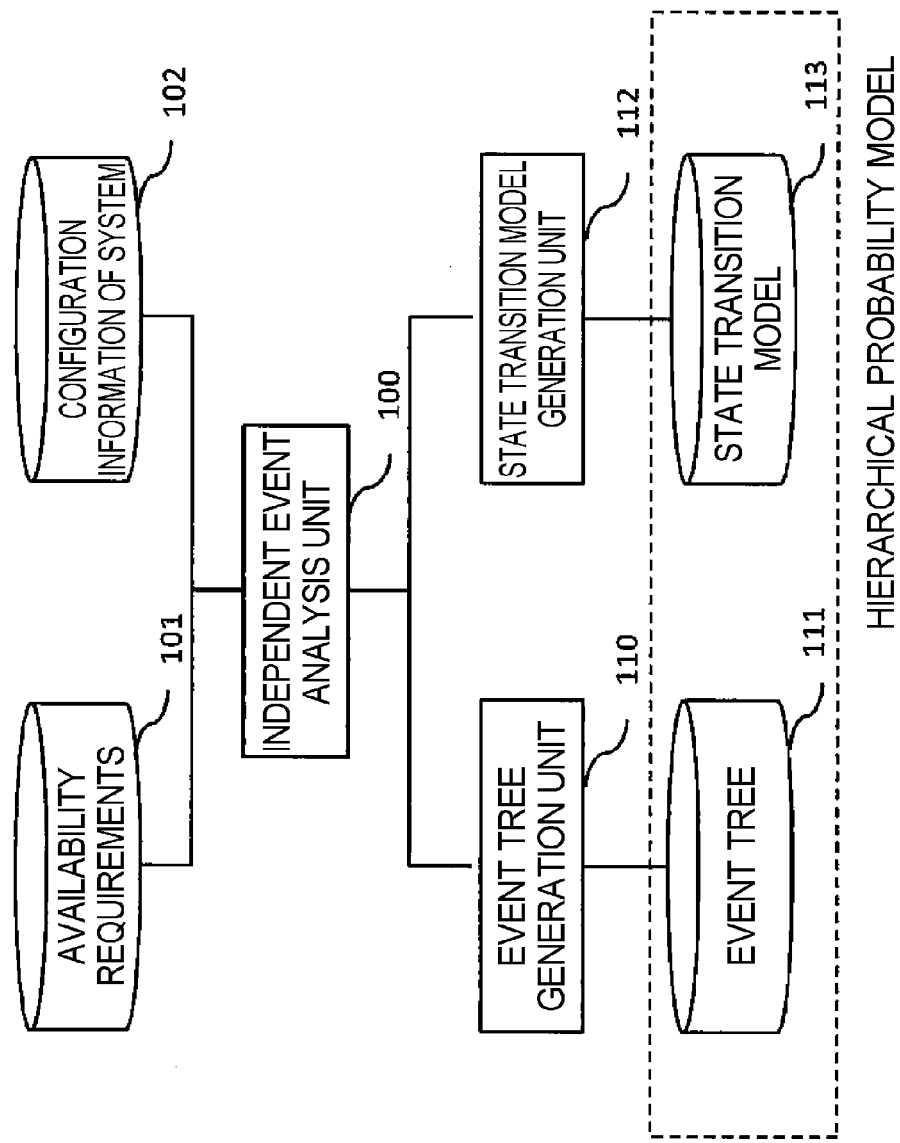
FIG. 1 is a block diagram illustrating the configuration of a hierarchical probability model generation system according to a first embodiment of the present invention.

FIG. 1 is a block diagram illustrating the configuration of a hierarchical probability model generation system according to a first embodiment of the present invention. As illustrated in the figure, the hierarchical probability model generation system includes an independent event analysis unit 100, an availability requirements storage unit 101, a unit 102 that stores the configuration information of the system, an event tree generation unit 110, an event tree storage unit 111, a state transition model generation unit 112, and a state transition model storage unit 113.

As the hierarchical probability model generation system, a dedicated or general-purpose computer including a CPU, a memory such as a ROM and a RAM, an external storage device that stores various information items, an input interface, an output interface, a communication interface, and a bus that connects them together can be applied. Note that the hierarchical probability model generation system may be configured by either a single computer or a plurality of computers connected to each other via communication lines.

The independent event analysis unit 100, the event tree generation unit 110, and the state transition model generation unit 112 correspond to the modules of functions implemented when a CPU executes a predetermined program stored in a ROM or the like. The availability requirements storage unit 101, the unit 102 that stores the configuration information of the system, the event tree storage unit 111, and the state transition model storage unit 113 are mounted by an external storage device.

The outline of the operations of the respective configuration elements will be described. First, availability requirements and the configuration information of the system as input data are stored in the availability requirements storage unit 101 and the unit 102 that stores the configuration information of the system, respectively. By referring to these input data items, the independent event analysis unit 100 determines (statistically independent) basic events independently of each other as the inputs of an event tree.

The event tree generation unit 110 generates an event tree configured by only independent basic events and stores the same in the event tree storage unit 111. The state transition model generation unit 112 generates a state transition model for finding the occurrence probability of each independent basic event and stores the same in the state transition model storage unit 113. An event tree and a state transition model to be finally output constitute a hierarchical probability model for analyzing the availability of the system.

Figure 2:
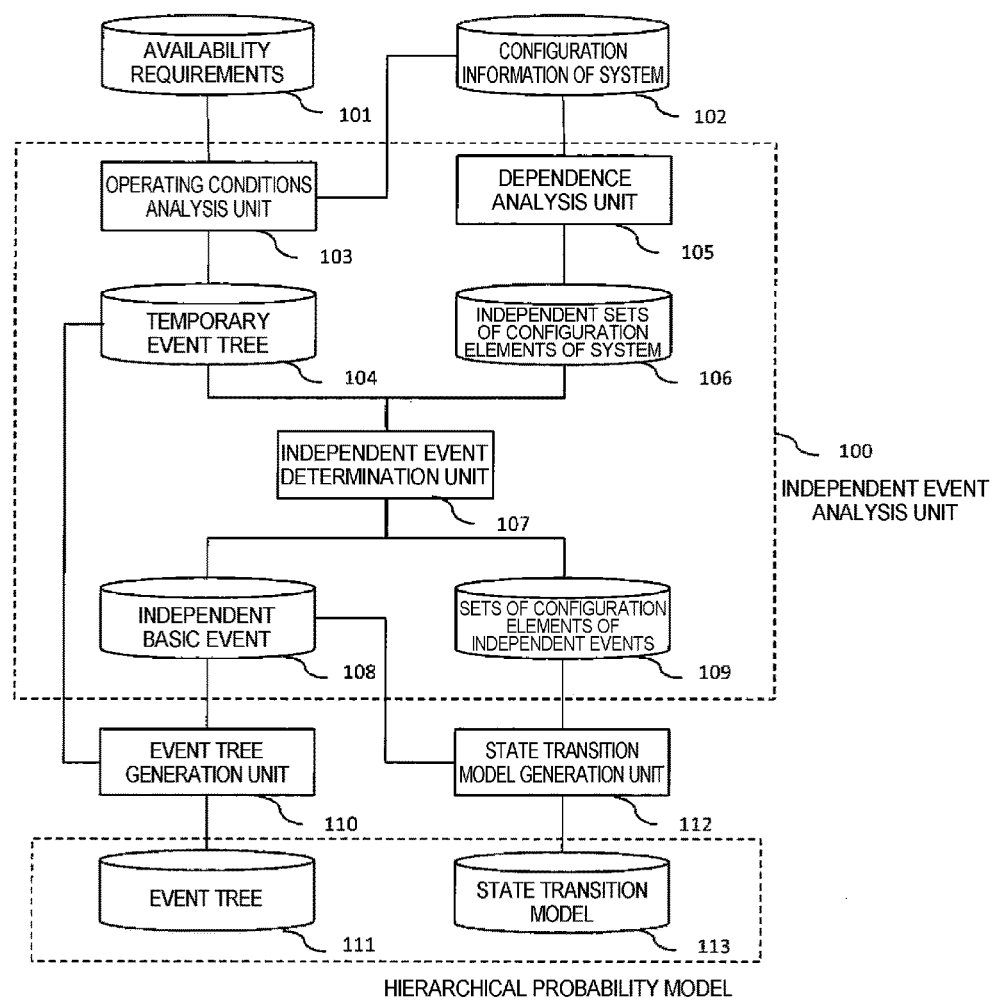
FIG. 2 is a block diagram illustrating the configuration of an independent event analysis unit according to the first embodiment of the present invention.

FIG. 2 is a block diagram illustrating the detailed configuration of the independent event analysis unit 100. The independent event analysis unit 100 includes an operating conditions analysis unit 103, a temporary event tree storage unit 104, a dependence analysis unit 105, a unit 106 that stores the independent sets of the configuration elements of the system, an independent event determination unit 107, an independent basic event storage unit 108, and a unit 109 that stores the sets of the configuration elements of independent events.

The outline of the operations of the respective configuration elements of the independent event analysis unit 100 will be described. The operating conditions analysis unit 103 generates a temporary event tree by referring to the availability requirements and the configuration information of the system and stores the same in the temporary event tree storage unit 104. The dependence analysis unit 105 extracts the independent sets of the configuration elements of the system by referring to the configuration information of the system and stores the same in the unit 106 that stores the independent sets of the configuration elements of the system. The independent event determination unit 107 specifies and stores independent basic events in the independent basic event storage unit 108 on the basis of a temporary event tree and the independent sets of the configuration elements of the system, while storing the sets of the configuration elements of the system corresponding to the independent basic events in the unit 109 that stores the sets of the configuration elements of independent events.

The event tree generation unit 110 updates a temporary event tree by referring to the independent basic event storage unit 108 and stores the same in the event tree storage unit 111. On the other hand, the state transition model generation unit 112 generates a state transition model by referring to the independent basic event storage unit 108 and the unit 109 that stores the sets of the configuration elements of independent events and stores the same in the state transition model storage unit 113.

[Description of Operations]

Next, the operations of the embodiment will be described with reference to the flowcharts illustrated in FIGS. 3 to 6.

Figure 3:
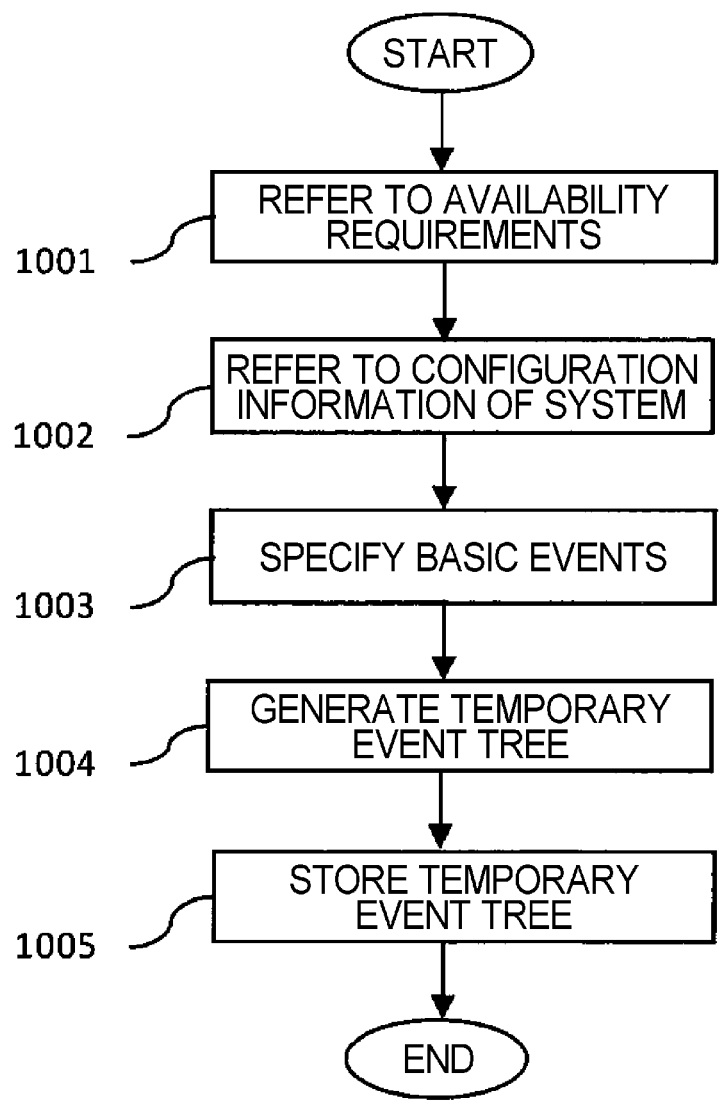
FIG. 3 is a flowchart illustrating an operation for generating a temporary event tree on the basis of availability requirements according to the first embodiment of the present invention.

FIG. 3 is a flowchart illustrating an operation for generating a temporary event tree on the basis of the availability requirements.

First, by referring to the input availability requirements 101, the operating conditions analysis unit 103 extracts conditions required for operating the system as a target (step 1001).

Next, by referring to the configuration information 102 of the system, the operating conditions analysis unit 103 specifies a configuration for satisfying the required conditions (step1002).

The availability requirement 101 provides information as to what and how many items are required for operating the system. On the other hand, the configuration information 102 of the system provides information as to what components (processes, a server, an imaginary server, a storage, or the like) configure the functions of the system and as to what dependence (a host relationship, a standby relationship, a failure spreading relationship, or the like) exists between the components. For example, consideration is given to a system configured by a function A and a function B. The availability requirements are provided as, for example, conditions that "the respective functions are required to be executed by at least one or more processes." On the other hand, the configuration information of the system provides the information that "processes a1 and a2 for executing the function A and processes b1 and b2 for executing the function B exist."

Using these information items, the operating conditions analysis unit 103 specifies basic events for satisfying the availability requirements (step 1003). In this example, the four basic events of "a1 operates," "a2 operates," "b1 operates," and "b2 operates" can be specified.

The operating conditions analysis unit 103 generates a temporary event tree on the basis of the relationship between the obtained basic events and the availability requirements (step 1004). The temporary event tree obtained in this example is equivalent to the following logical expression.

System Operation=([a1 operates] OR [a2 operates])
AND ([b1 operates] OR [b2 operates])

That is, it is expressed that the system is in its operating state unless the two processes stop at the same time in any of the function A and the function B. The generated temporary event tree is stored in the temporary event tree storage unit 104 (step 1004). The temporary event tree expresses the availability requirements, but the basic events as the inputs of an event tree are not necessarily independent events. Accordingly, the dependence of the system will be next analyzed.

Figure 4:
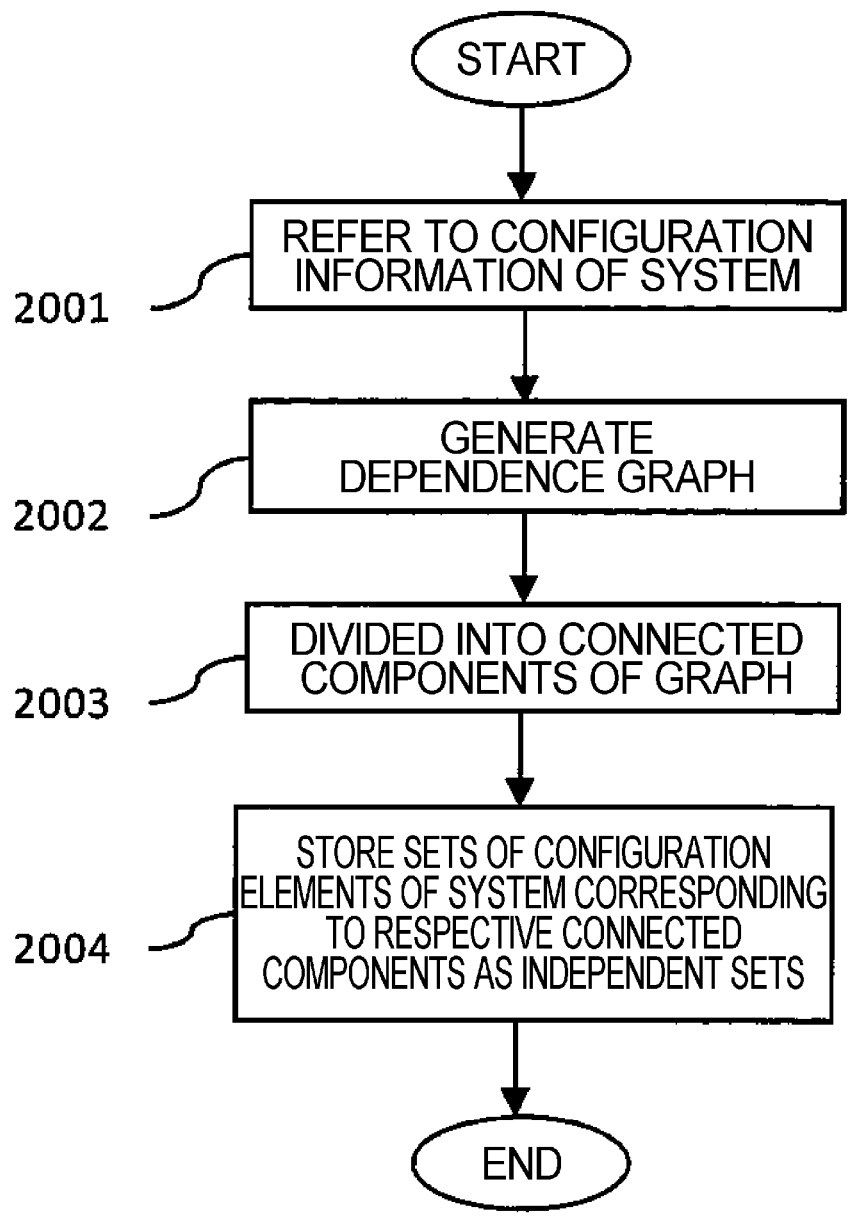
FIG. 4 is a flowchart illustrating an operation for generating a state transition model on the basis of the configuration information of the system.

FIG. 4 is a flowchart illustrating an operation for generating a state transition model on the basis of the configuration information of the system. By referring to the unit 102 that stores the configuration information of the system (step 2001), the dependence analysis unit 105 generates a dependence graph on the basis of a description expressing the dependence between the configuration elements (step 2002). The dependence graph generated here has a graph structure in which the configuration elements of the system are defined as nodes and the dependence between the configuration elements is defined as an edge.

Next, the dependence graph is divided into connected components (step 2003). In order to derive the connected components, an algorithm generally known in a graph theory is used. Since no dependence exists between the connected components, the independent sets of the configuration elements of the system can be obtained from the respective connected components (step 2004). The obtained independent sets Si ($1 \leq i \leq n$) are stored in the unit 106 that stores the independent sets of the configuration elements of the system.

Figure 5:
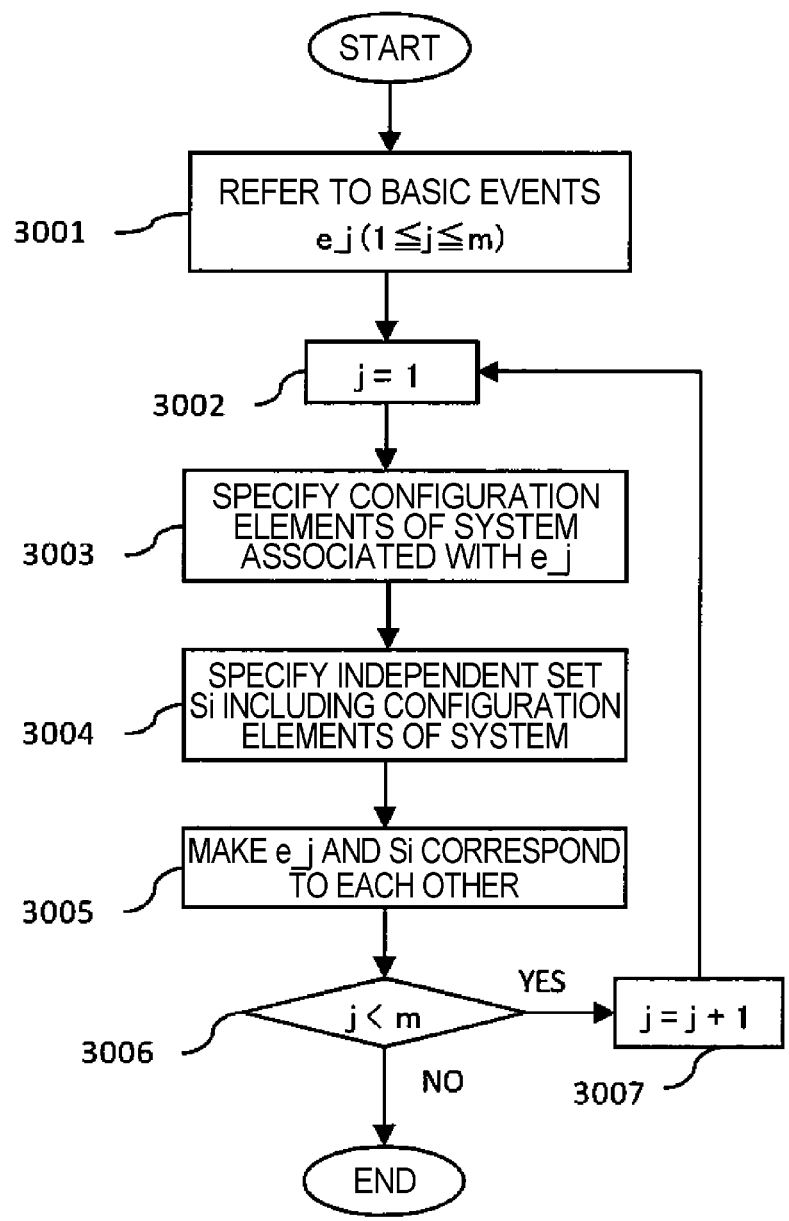
FIG. 5 is a flowchart illustrating an operation for specifying the correspondence between basic events and the independent sets of the configuration elements of the system according to the first embodiment of the present invention.

Using FIGS. 5 and 6, an operation for determining independent basic events from a temporary basic tree and the independent sets of the configuration elements of the system will be described.

First, by referring to the temporary event tree storage unit 104, the independent event determination unit 107 acquires the sets $e\_j$ ($1 \leq j \leq m$) of basic events configuring a temporary event tree (step 3001).

Next, the independent event determination unit 107 specifies the configuration elements of the system associated with $e\_j$ for each of the basic events $e\_j$ and specifies an independent set Si including the configuration elements (steps 3003 and 3004). This processing corresponds to the processing for specifying the independent set Si including the process a1 in the previous example. Thus, the correspondence between the basic event $e\_j$ and the independent set Si is obtained (step 3005). In other words, it indicates that the basic event $e\_j$ occurs with a change in the states of the configuration elements of the system included in the independent set Si.

Figure 6:
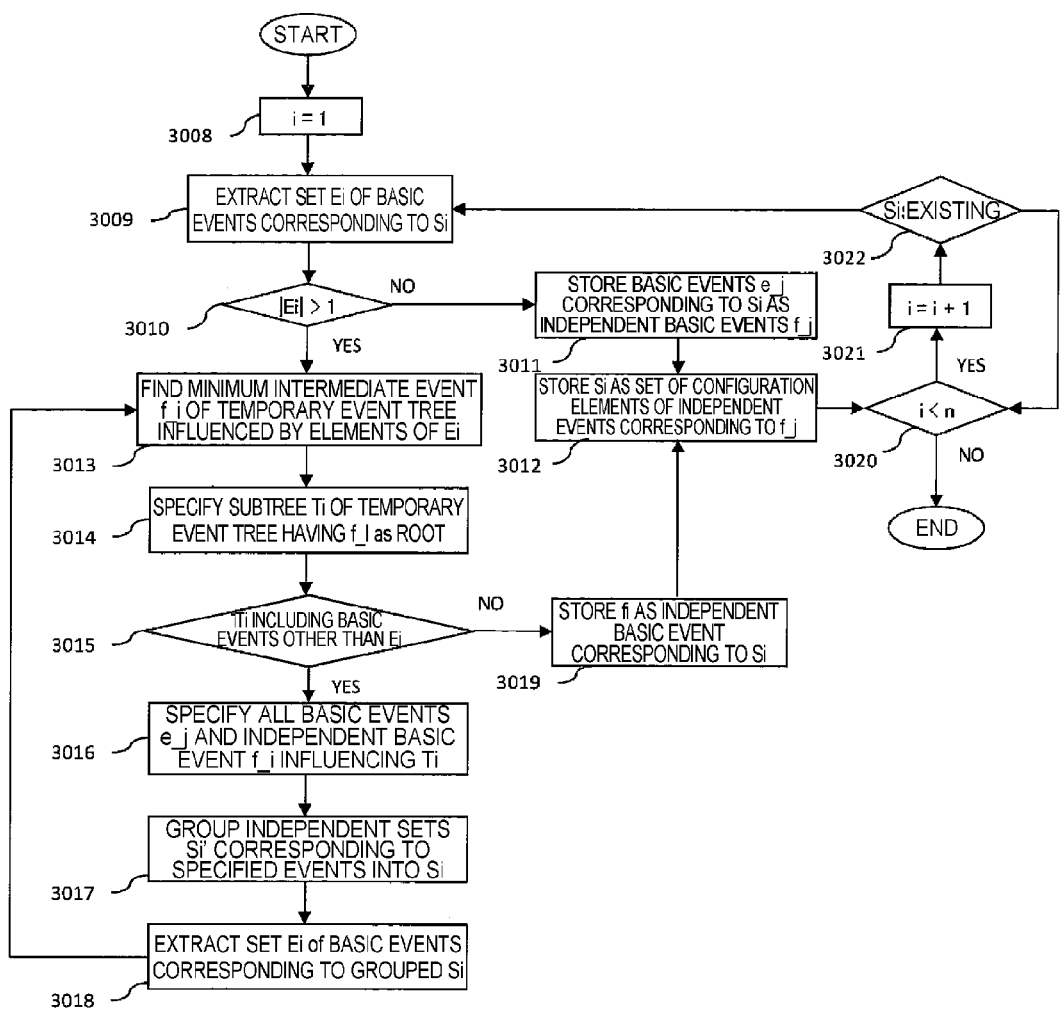
FIG. 6 is a flowchart illustrating an operation for specifying independent basic events according to the first embodiment of the present invention.

Next, as illustrated in the flowchart of FIG. 6, independent basic events are determined, and the sets of the configuration elements of the independent events as the sets of the configuration elements of the system corresponding to the independent basic events are determined.

When a plurality of basic events $e\_j$ corresponds to a common independent set Si, these basic events are not independent of each other.

The independent event determination unit 107 extracts a set Ei of the basic events corresponding to Si (step 3009) and determines whether |Ei|>1 is given, i.e., whether the number of the basic events corresponding to Si is two or more (step 3010). When |Ei|>1 is given, consideration has to be given to the dependence between these events.

Since a one-to-one relationship exists between $e\_j$ and Si when |Ei|=1 is given (step 301; NO), $e\_j$ is stored in the independent basic event storage unit 108 and Si is stored in the unit 109 that stores the sets of the configuration elements of independent events (steps 3011 and 3012).

When |Ei|>1 is given (step 3010; YES), a minimum intermediate event $f\_i$ influenced by all the basic events belonging to Ei of a temporary event tree T is found (step 3013). Here, the minimum intermediate event indicates an event that corresponds to a node having a minimum height (having a maximum distance from a root node) among all the intermediate nodes influenced by the basic events of Ei of the temporary event tree T and is generated when only items associated with the basic events of Ei are extracted from the node.

For example, consideration is given to a case in which Ei={$e\_2, e\_4$} is given with respect to the temporary event tree T=$e\_1$ AND ($e\_2$ OR $e\_3$ OR ($e\_4$ AND $e\_5$)). Two nodes, i.e., the root node of T and an intermediate node T1=($e\_2$ OR $e\_3$ OR ($e\_4$ AND $e\_5$)) are influenced by Ei, but the intermediate node T1 has a minimum height. Since the items $e\_2$ and ($e\_4$ AND $e\_5$) are influenced by the basic events of Ei in T1, the minimum intermediate event $f\_i$ is $f\_i=e\_2$ OR ($e\_4$ AND $e\_5$).

The intermediate event $f\_i$ thus extracted can be handled as an event in which the influences of all the basic events belonging to Ei are put together. However, when $f\_i$ includes the influences of basic events other than Ei, these events also have to be taken into consideration.

Accordingly, next, a subtree Ti of the temporary event tree having $f\_i$ as a root is specified, and determination is made as to whether Ti includes basic events other than Ei (steps 3014 and 3015). When Ti is configured by only the basic events of Ei (step 3015; NO), $f\_i$ is determined as the independent basic event corresponding to Si and stored in the independent basic event storage unit 108 (step 3019).

On the other hand, when basic events $e\_i$ other than Ei or other independent basic events $f\_i$ exist (step 3015; YES), independent sets Si' corresponding to these events is all grouped into Si (steps 3016 and 3017). Moreover, the set Ei of the basic events is extracted again from the regrouped Si to search for a new intermediate event $f\_i$ (step 3018). This procedure is repeatedly performed until the subtree Ti corresponding to the generated $f\_i$ is configured by only the elements of Ei.

Since at least the root node includes all the basic events, $f\_i$ is determined when at least the root node is selected. Si regrouped by this procedure is stored in the independent basic event storage unit 108 as the set of the configuration elements of the independent events corresponding to $f\_i$ (step 3012). By repeatedly performing the procedure on the remaining independent sets Si, all the independent basic events $f\_i$ and the corresponding sets of the configuration elements of the independent events can be specified.

Figure 7:
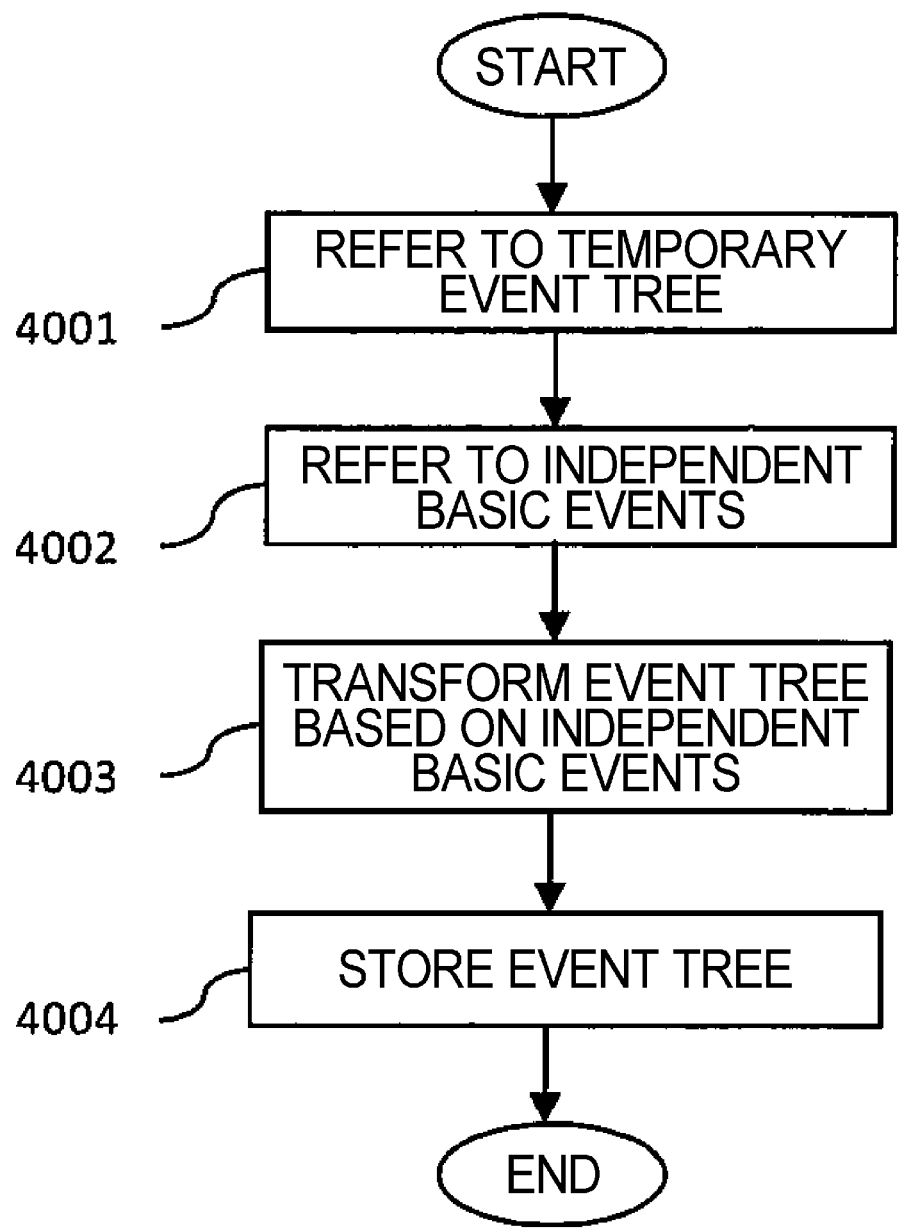
FIG. 7 is a flowchart illustrating an operation for generating an event tree according to the first embodiment of the present invention.

FIG. 7 is a flowchart illustrating an operation for generating an event tree from a temporary event tree and independent basic events. By referring to the independent basic event storage unit 108 and the temporary event tree storage unit 104 (steps 4001 and 4002), the event tree generation unit 110 transforms an event tree into one having independent basic events as leaf nodes (step 4003) and stores the same in the event tree storage unit 111 (step 4004). Since the independent basic events correspond to intermediate nodes in a temporary event tree, the obtained event tree serves as the subtree of the temporary event tree.

Figure 8:
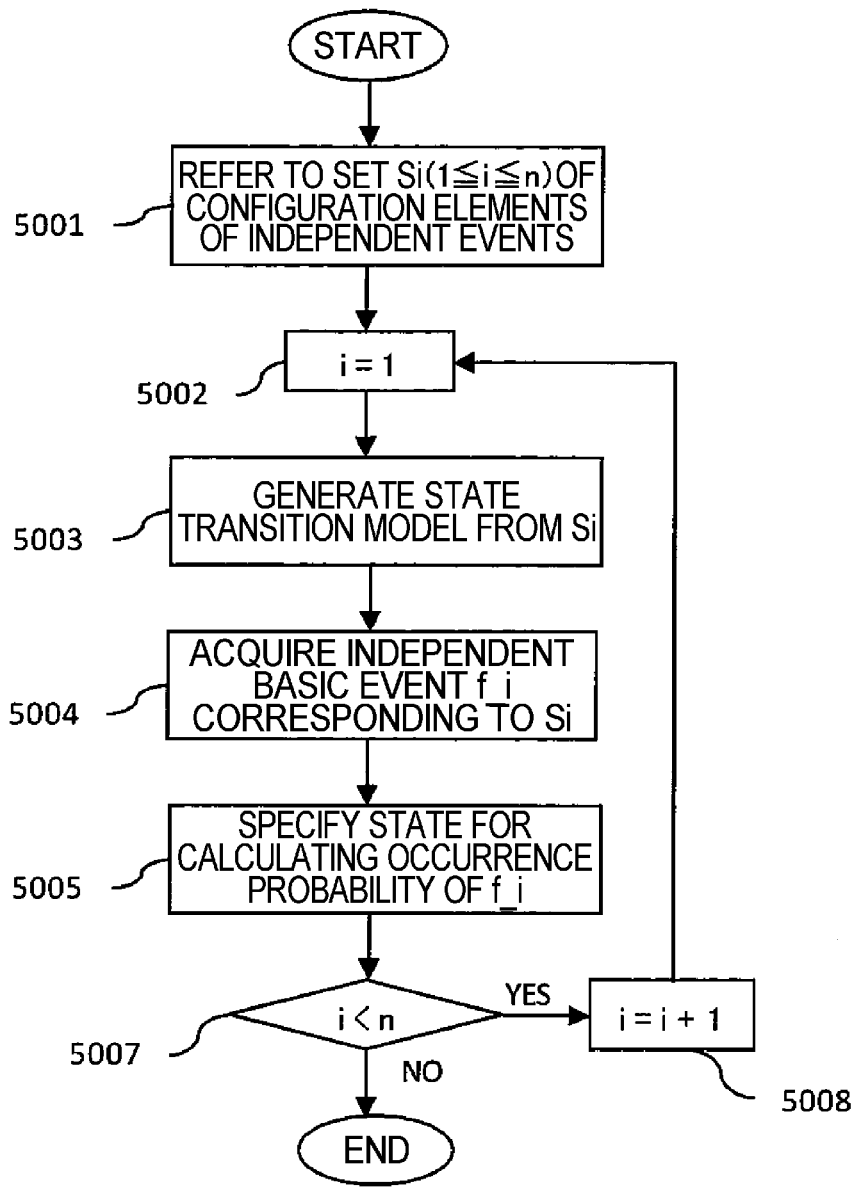
FIG. 8 is a flowchart illustrating an operation for generating state space models corresponding to the independent basic events according to the first embodiment of the present invention.

FIG. 8 is a flowchart illustrating an operation for generating a state space model corresponding to each set of the configuration elements of independent events from independent basic events and the set of the configuration elements of the independent events.

The state transition model generation unit 112 generates a state transition model from each set Si of the configuration elements of the independent events stored in the unit 109 that stores the sets of the configuration elements of the independent events (steps 5001 to 5003). As means for generating the state transition model on the basis of the dependence between the configuration elements of the system, a method described in Non-Patent Document 2 can be used. According to this method, a state space model is generated using the components of the state space model defined in advance for each of the types of the configuration elements and a rule in which the components are combined together on the basis of the information of the dependence.

Next, the independent basic event f_i corresponding to Si is acquired from the independent basic event storage unit 108 (step 5004). Since f_i is associated with the state of the state space model generated from Si, a state corresponding to f_i is specified (step 5005). By the calculation of the probability of this state, the occurrence probability of f_i can be found.

With the event tree 111 and the state transition model 113 obtained by the above operations, a hierarchical probability model for analyzing the availability of the system as a target is obtained.

Figure 9:
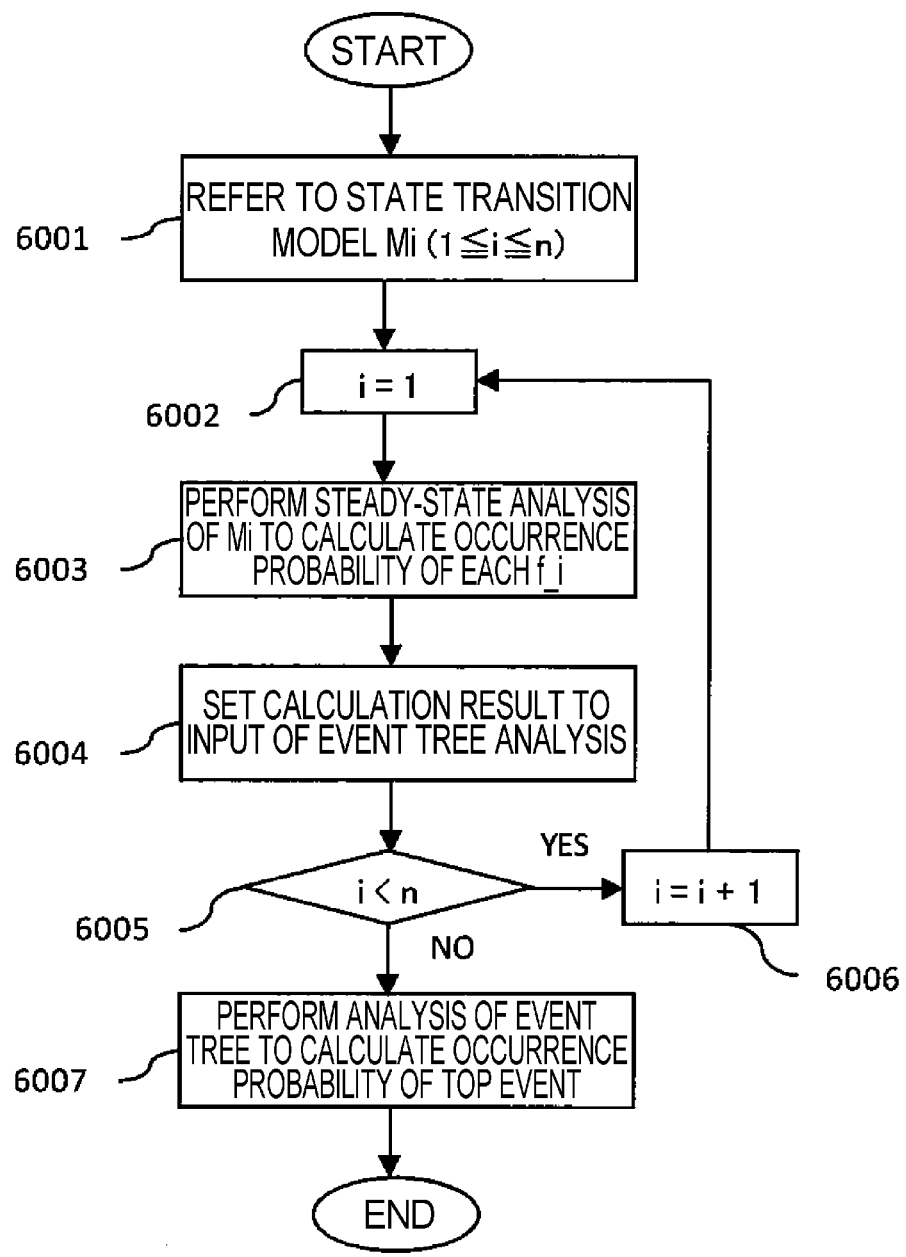
FIG. 9 is a flowchart illustrating an operation for analyzing a hierarchical probability model according to the first embodiment of the present invention.

Next, an example of performing an analysis with a hierarchical probability model will be described using FIG. 9. Here, in order to perform an analysis with a hierarchical probability model, a method described in Non-Patent Document 1 or the like is used.

In a hierarchical probability model, it is first required to find the occurrence probabilities of the independent basic events of an event tree. The occurrence probabilities can be found by the analysis of state transition models corresponding to the independent basic events. First, a state transition model Mi stored in the state transition model storage unit 113 is referred (step 6001).

Next, the occurrence probability of the basic independent event f_i is calculated by the steady-state analysis of Mi (step 6003). A numerical analysis method, a discrete-time simulation, or the like is used for the steady-state analysis of the state transition model (for example, a CTMC), whereby the probability of each state in its steady state can be found and the occurrence probability of the event can be calculated from this steady-state probability. The calculated occurrence probability is set to the input of the event tree 104 (step 6004), and the occurrence probability of a top event is calculated by the analysis of the event tree after all the input values are found (step 6007). The analysis of the event tree is performed in the same way as the calculation of a probability in a fault tree, and the probability is calculated on the basis of the logical operation between basic events.

As described above, since the embodiment is so configured that independent basic events, which can be calculated independently of each other on the basis of the availability requirements and the configuration information of the system, are specified and that an event tree having only the independent basic events as inputs and state transition models for finding the occurrence probabilities of the independent basic events are generated, a hierarchical probability model for performing an availability analysis can be automatically generated.

Second Embodiment

Figure 10:
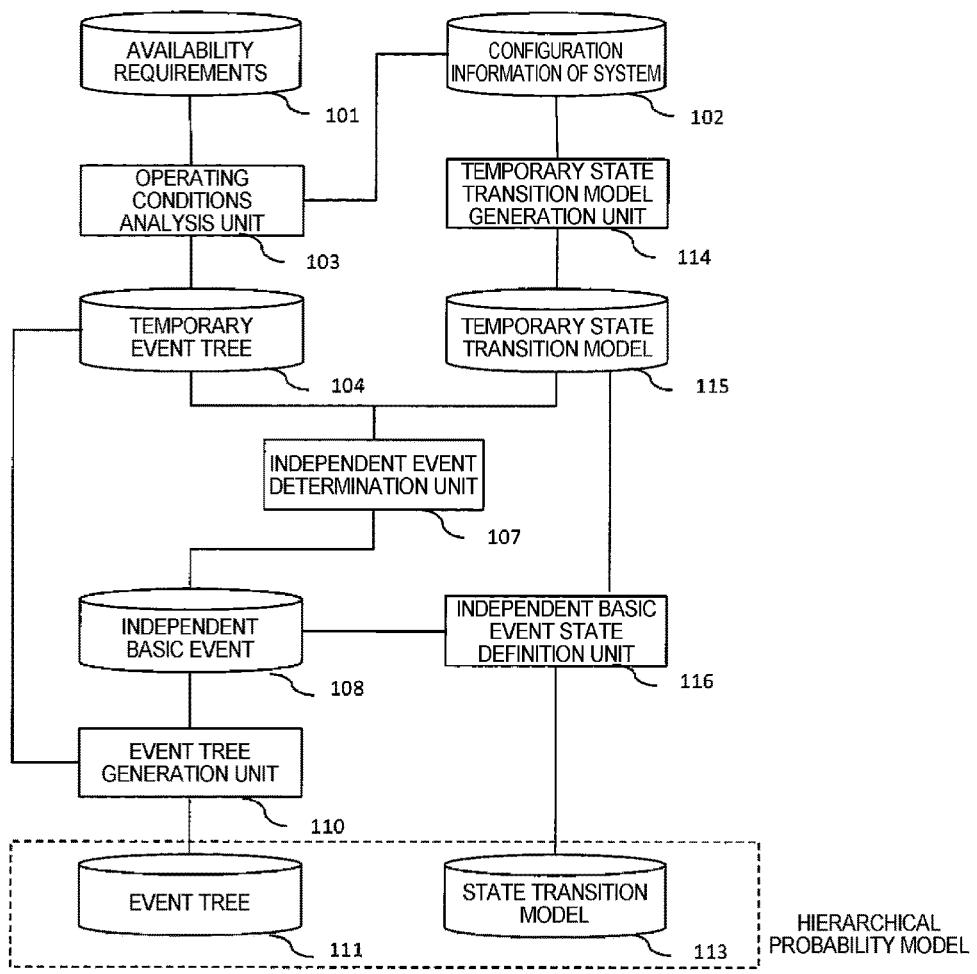
FIG. 10 is a block diagram illustrating the configuration of a hierarchical probability model generation system according to a second embodiment of the present invention.

FIG. 10 is a block diagram illustrating the configuration of a hierarchical probability model generation system according to a second embodiment of the present invention. The same symbols of FIGS. 1 and 2 express configuration elements corresponding to each other.

As illustrated in FIG. 10, the second embodiment includes an availability requirements storage unit 101, a unit 102 that stores the configuration information of the system, an operating conditions analysis unit 103, a temporary event tree storage unit 104, an independent event determination unit 107, an independent basic event storage unit 108, an event tree generation unit 110, an event tree storage unit 111, a state transition model storage unit 113, a temporary state transition model generation unit 114, a temporary state transition model storage unit 115, and an independent basic event state definition unit 116.

The outline of the operations of the respective configuration elements will be described. First, availability requirements and the configuration information of the system as input data are stored in the availability requirements storage unit 101 and the unit 102 that stores the configuration information of the system, respectively. By referring to the availability requirements and the configuration information of the system, the operating conditions analysis unit 103 generates a temporary event tree 104.

The temporary state transition model generation unit 114 generates a state transition model that expresses the behaviors of the configuration elements of the system by referring to the configuration information of the system and stores the same in the temporary state transition model storage unit 115. The independent event determination unit 107 specifies independent basic events on the basis of a temporary event tree 104 and a temporary state transition model 115 and stores the same in the independent basic event storage unit 108.

The event tree generation unit 110 updates a temporary event tree by referring to the independent basic event storage unit 108 and stores the same in the event tree storage unit 111. On the other hand, the independent basic event state definition unit 116 specifies the state of each independent basic event on a corresponding state transition model and updates and stores the state transition model in the state transition model storage unit 113. An event tree 111 and a state transition model 113 to be finally output constitute a hierarchical probability model for analyzing the availability of the system.

Next, the operation of this embodiment will be described with reference to the flowcharts illustrated in FIG. 3 and FIGS. 11 to 13.

FIG. 3 is the flowchart illustrating an operation for generating a temporary event tree with the operating conditions analysis unit 103, and the operation is the same as that of the first embodiment.

Figure 11:
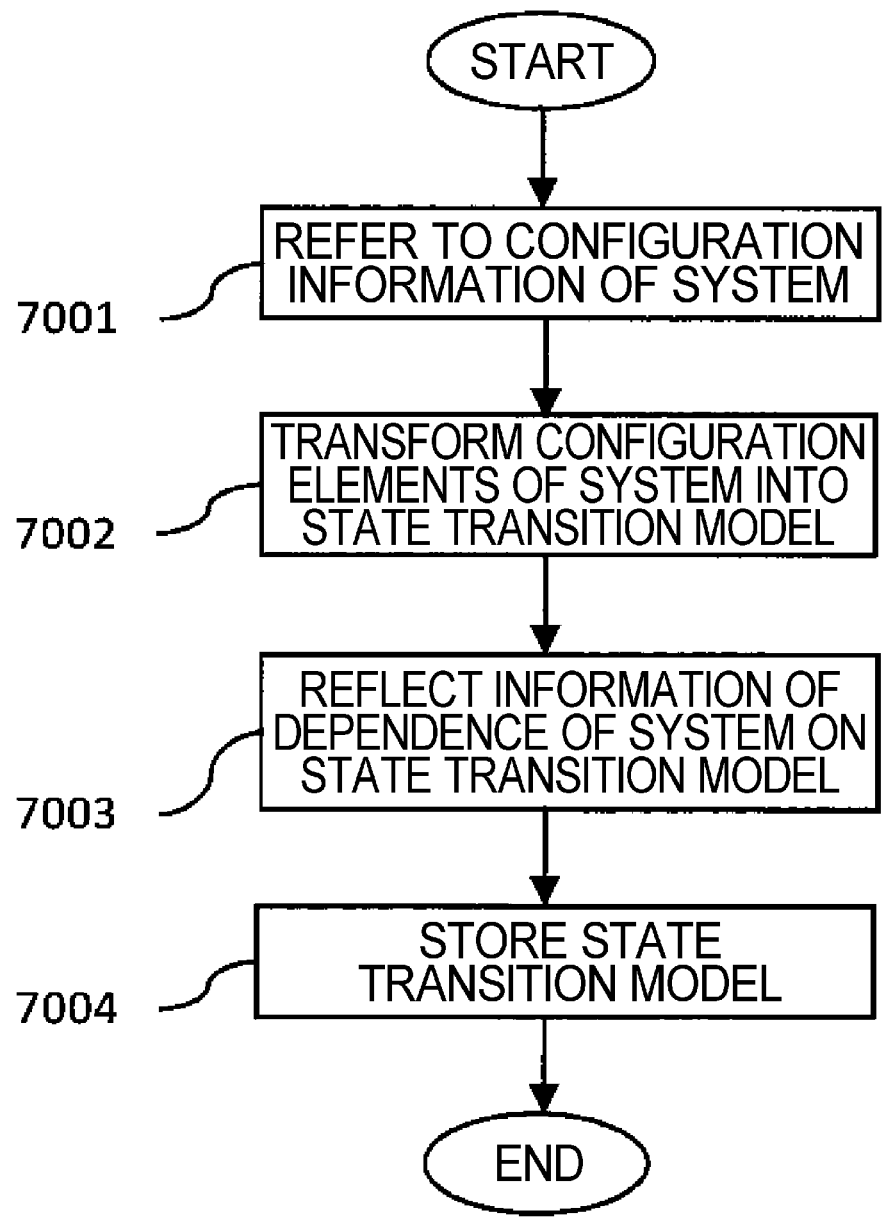
FIG. 11 is a flowchart illustrating an operation for generating state transition models from the configuration elements of the system according to the second embodiment of the present invention.

FIG. 11 is a flowchart illustrating an operation for generating a temporary state transition model from the configuration information of the system. By referring to the configuration information 102 of the system (step 7001), the temporary state transition model generation unit 114 specifies the dependence between the configuration elements of the system.

Next, the temporary state transition model generation unit 114 transforms each of the configuration elements of the system into a state transition model according to a rule determined in advance (step 7002).

Then, the temporary state transition model generation unit 114 makes a correction to each dependence information of the system to express the dependence with the state transition model (step 7003).

The generated state transition model is stored in the temporary state transition model storage unit 115 (step 7004). In order to generate the state transition model, a known method such as one described in Non-Patent Document 2 is used.

Figure 12:
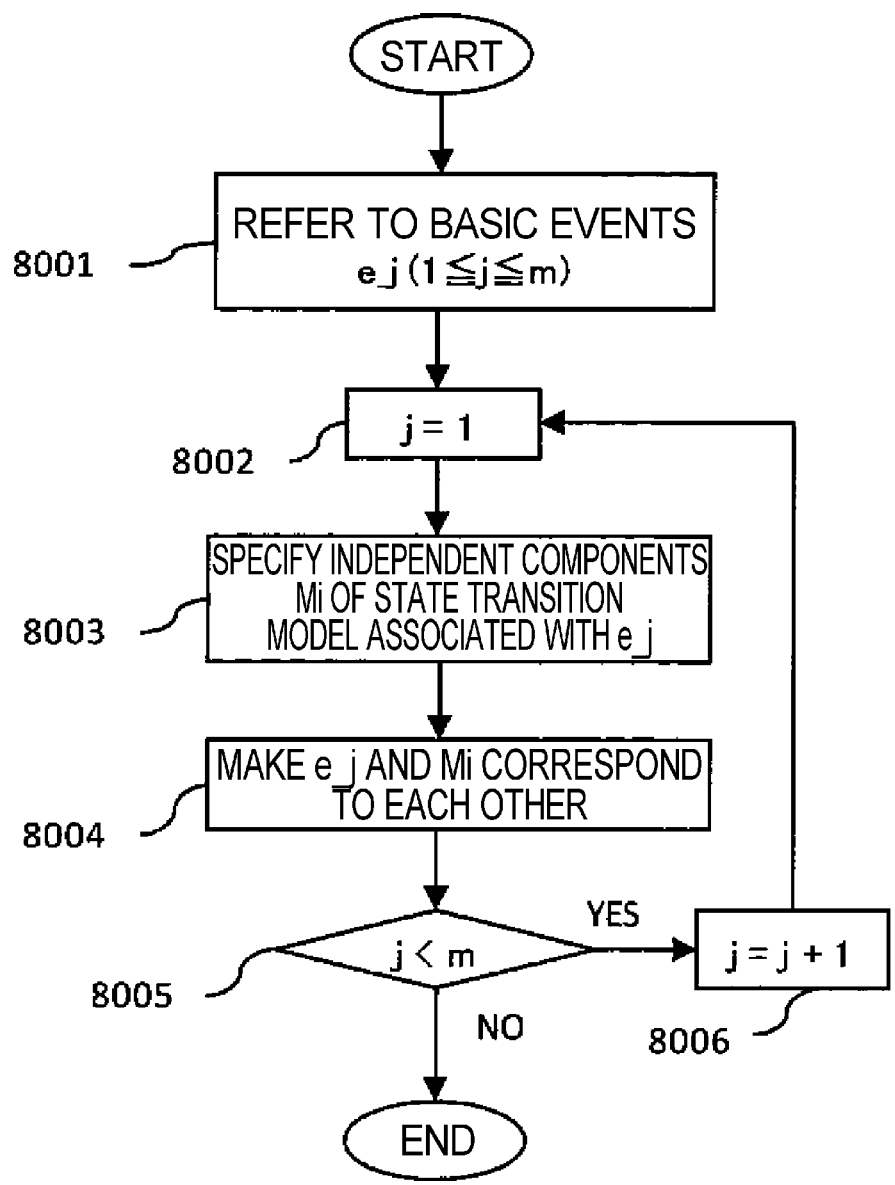
FIG. 12 is a flowchart illustrating an operation for specifying the correspondence between basic events and the independent components of the state transition models according to the second embodiment of the present invention.

FIG. 12 is a flowchart illustrating an operation for making the basic events of a temporary event tree and the independent components of a temporary state transition model correspond to each other. By referring to a temporary event tree 104, the independent event determination unit 107 acquires the sets e_j (1≤j≤m) of basic events configuring the temporary tree (step 8001).

Next, the independent event determination unit 107 specifies the independent components Mi of a state transition model associated with e_j for each of the basic events e_j (step 8003). Here, the subsets Mi of the state transition model as independent components indicate that all the state transitions of Mi do not influence state transitions other than Mi and the state transitions of Mi are not influenced by the state transitions other than Mi. Thus, the correspondence between the basic event e_j and the independent components Mi is obtained (step 8004).

Next, the independent event determination unit 107 specifies independent basic events from the correspondence between e_j and Mi. In the flowchart illustrated in FIG. 6, the independent sets Si of the configuration elements of the system are replaced with the independent components Mi of the state transition model, whereby the independent basic events can be specified in the same procedure. An operation for generating an event tree on the basis of the specified independent basic events is the same as that of FIG. 7 according to the first embodiment.

Figure 13:
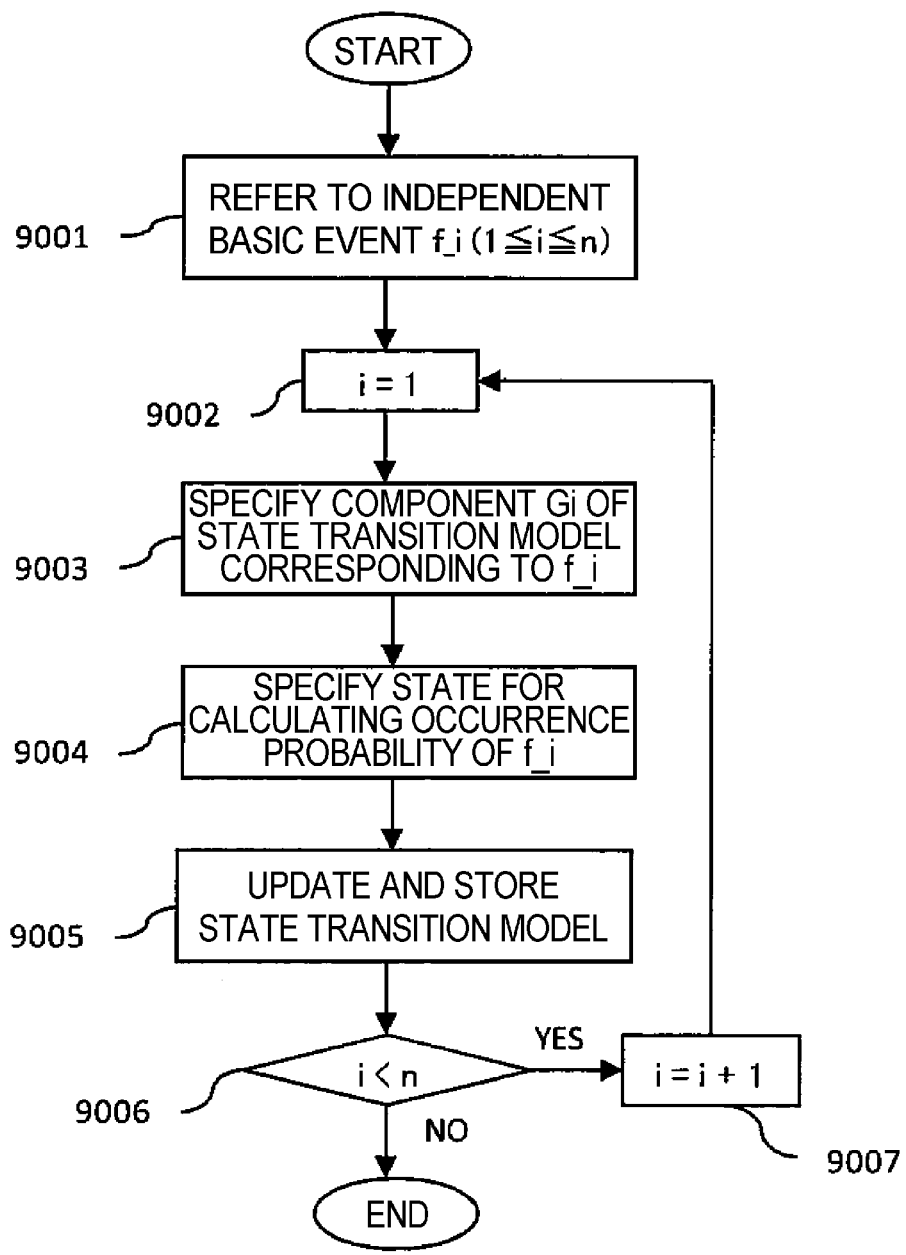
FIG. 13 is a flowchart illustrating an operation for specifying the states of the state transition models corresponding to the basic events according to the second embodiment of the present invention.

FIG. 13 is a flowchart illustrating an operation for specifying a state on a state transition model corresponding to a specified independent basic event.

The independent basic event state definition unit 116 specifies a component Gi of a state transition model corresponding to f_i for each independent basic event f_i (steps 9001 to 9003). The component Gi is obtained when an independent basic event is specified, and corresponds to the set of the configuration elements of independent events in the flowchart of FIG. 6. In addition, the component Gi includes a plurality of independent components Mi in some cases.

Next, the independent basic event state definition unit 116 specifies a state corresponding to f_i in the specified Gi (step 9004). For example, when f_1 expresses the event ([a1 operates] OR [a2 operates]), the independent basic event state definition unit 116 finds a state, in which at least one of a1 and a2 operates, in Gi. The probability of this state in the state transition model is the occurrence probability of f_i.

The independent basic event state definition unit 116 defines a state corresponding to f_i to update the state transition model and stores the updated state transition model in the state transition model storage unit 113 (step 9005).

As described above, this embodiment is so configured that a temporary state transition model is first generated, basic independent events are specified by correspondence with a temporary event tree, and a state for calculating the occurrence probabilities of the basic independent events is finally specified. Thus, the basic independent events can be specified by the independent event determination unit even if the temporary state transition model is manually corrected, and a corresponding hierarchical probability model can be generated. Accordingly, this embodiment can also be applied to a case in which a user appropriately corrects a state model to perform modeling when if it is difficult to completely automatically generate the state model.

EXAMPLE

As an example of the present invention, an example of evaluating the availability of a three-tier Web application system will be described.

Figure 15:
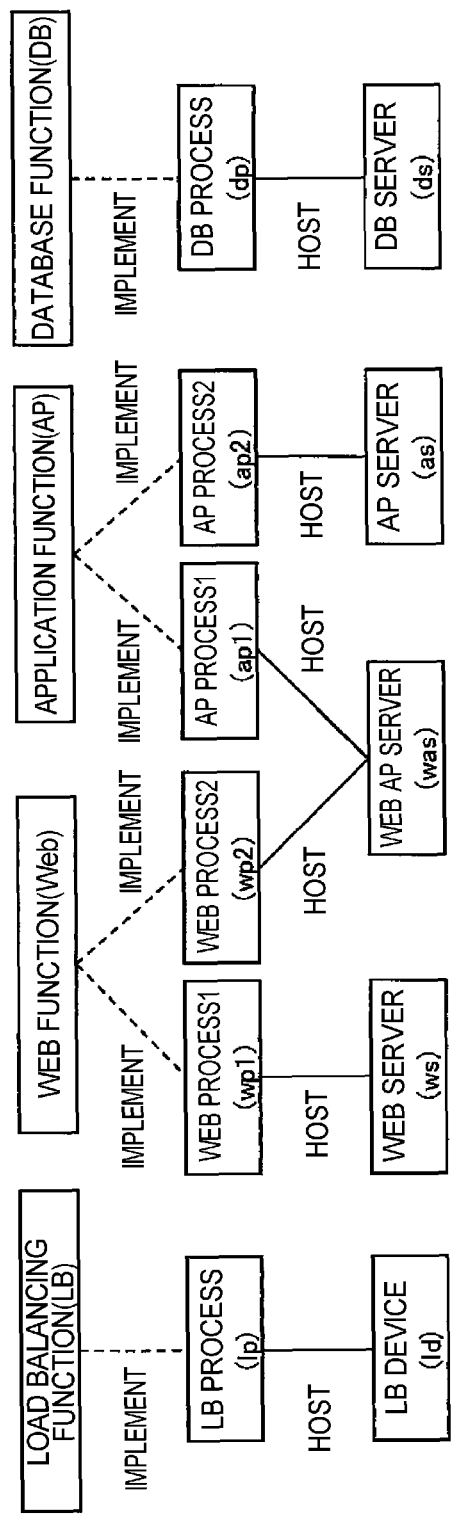
FIG. 15 is a diagram illustrating the configuration information of the system according to the example of the present invention.

FIGS. 14 and 15 are, respectively, the examples of availability requirements and the configuration information of the system as inputs to evaluate the availability with respect to the three-tier Web application system.

The system is configured by the four functions of a load distribution function (LB), a Web function (Web), an application function (AP), and a database function (DB). The availability requirements of FIG. 14 indicate that at least one process is required for each of the functions to operate the system (see the second row of the table).

While, the configuration information of the system of FIG. 15 indicates processes and hardware devices configuring the system and the dependence between them. For example, the relationship of "implementation" exists between the load distribution function (LB) and an LB process. This indicates that the load distribution function is implemented by the LB process. In addition, the relationship of "host" exists between the LB process and an LB device. This indicates that the LB process is hosted to operate on the LB device.

Any of the information of these dependence is a relationship that influences the availability and is required to be taken into consideration to evaluate the availability. For example, since the LB process operates on the LB device, the LB process also stops when a failure occurs in the LB device. Since the process for implementing the load distribution function does not exist when the LB process stops, the load distribution function becomes no longer available. Same applies to the Web function, the application function, and the database function.

In addition, the configuration of the system of FIG. 15 indicates that both a Web process 2 and an AP process 1 have the relationship of "host" with a Web AP server (was). That is, the Web process 2 and the AP process 1 share the one Web AP server.

In response to these inputs, the operating conditions analysis unit 103 generates a temporary event tree according to the operation illustrated in the flowchart of FIG. 3. Since the processes for implementing the functions can be specified for the respective functions included in the availability requirements, the six basic events of "lp operates," "wp1 operates," "wp2 operates," "ap1 operates," "ap2 operates," and "dp operates" exist. When an event in which a process x operates is indicated as Ax, an event Asys in which the system is in its operating state can be expressed as follows by the availability requirements.

$$Asys = Alp \text{ AND } (Awp1 \text{ OR } Awp2) \text{ AND } (Aap1 \text{ OR } Aap2) \text{ AND } Adp$$

Figure 16:
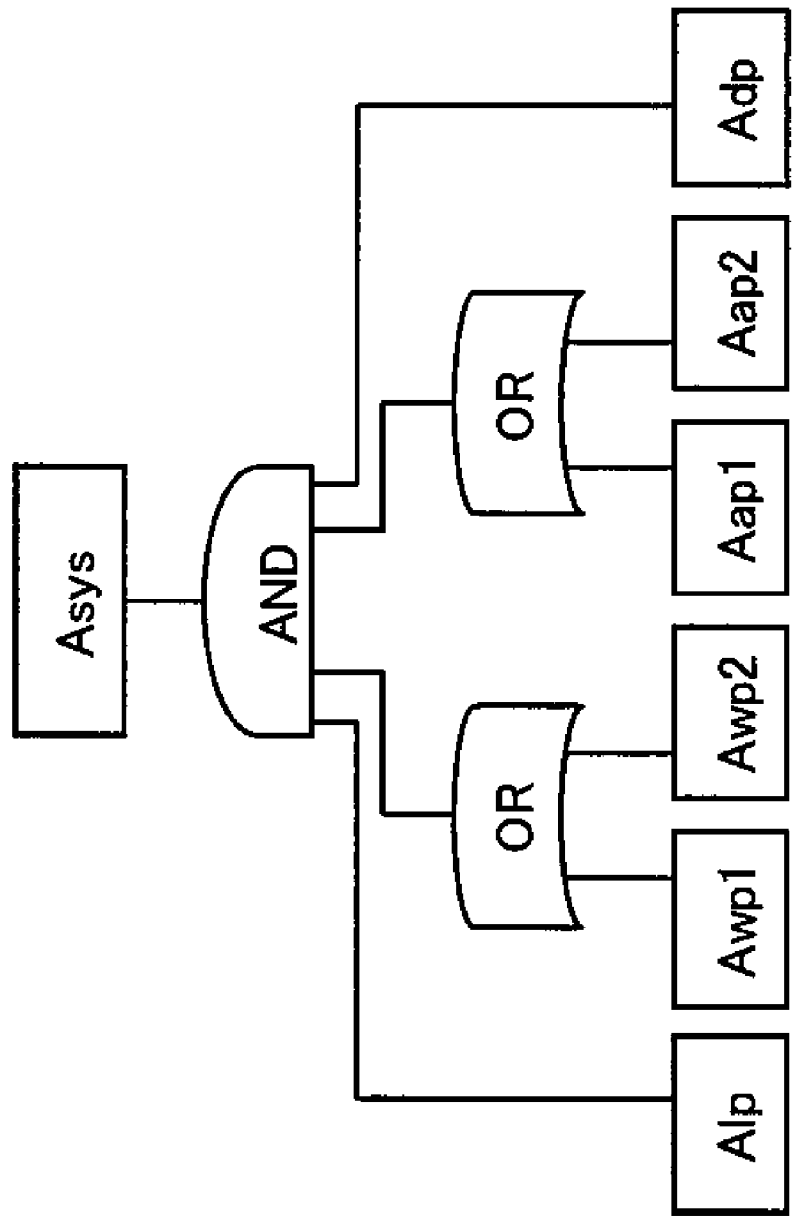
FIG. 16 is a diagram illustrating a temporary event tree according to the example of the present invention.

Since the Web function and the AP function act when one of the two redundant processes operates, they have the relationship of OR. FIG. 16 expresses an event tree corresponding to Asys. For example, when the LB process stops, Alp becomes false (=0) and Asys also immediately becomes false (=0). In addition, when the Web process 1 stops, Awp1 becomes false. However, Asys does not become false so long as Awp2 is true (=1).

The dependence analysis unit 105 generates the dependence graph of the configuration elements of the system from the configuration information of the system according to the operation illustrated in the flowchart of FIG. 4. The dependence graph is obtained by abstracting blocks expressing the processes of the configuration elements of the system and blocks expressing the device and the servers thereof illustrated in FIG. 15 as nodes and by abstracting the dependence between the blocks as an edge.

Figure 17:
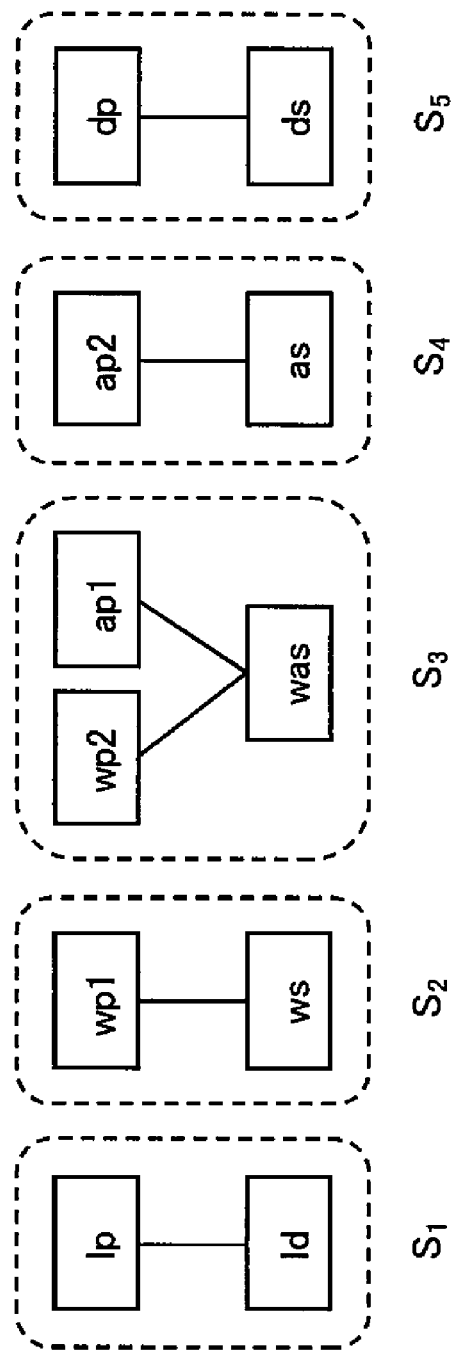
FIG. 17 is a diagram illustrating the independent sets of the configuration elements of the system according to the example of the present invention.

FIG. 17 illustrates the generated graph of the dependence. Regions indicated by dotted lines in FIG. 17 express the connected components of the graph. No side exists between the connected components. From the respective connected components, the five independent sets of the configuration elements of the system S1={Ip, Id}, S2={wp1, ws}, S3={wp2, ap1, was}, S4={ap2, as}, and S5={dp, ds} are obtained.

Figure 18:
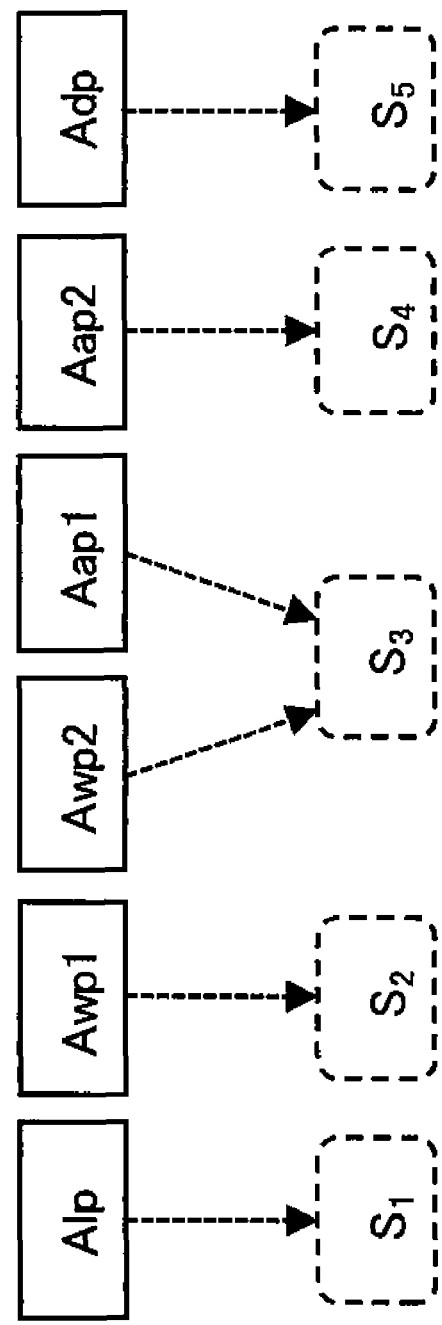
FIG. 18 is a diagram illustrating the correspondence between basic events and the independent sets of the configuration elements of the system according to the example of the present invention.

Next, using the temporary event tree and the independent sets of the configuration elements of the system as inputs, the independent event determination unit 107 determines independent basic events for configuring the event tree. The independent event determination unit 107 first specifies the independent sets of the configuration elements of the system corresponding to the basic events of the temporary tree according to the operation illustrated in the flowchart of FIG. 5. As a result, dependence illustrated in FIG. 18 is obtained. For example, the basic event Alp in which the LB process operates corresponds to the independent set S1. In addition, both the basic event Awp2 in which the Web process 2 operates and the basic event Aap1 in which the AP process 1 operates correspond to the independent set S3.

Based on the information of the dependence obtained here, the independent basic events corresponding to the respective independent sets Si are generated according to the flowchart of FIG. 6. When one basic event corresponds to Si, the event is stored as the independent basic event f_i (steps 3010 and 3011 of FIG. 6). Here, since the basic event corresponding to S1 is Alp only, Alp is stored as the basic independent event f_1. Same applies to S2, S4, and S5.

On the other hand, when two or more basic events correspond to Si, it is required to find an intermediate event f_i including them of the temporary event (step 3013 of FIG. 6).

Figure 19:
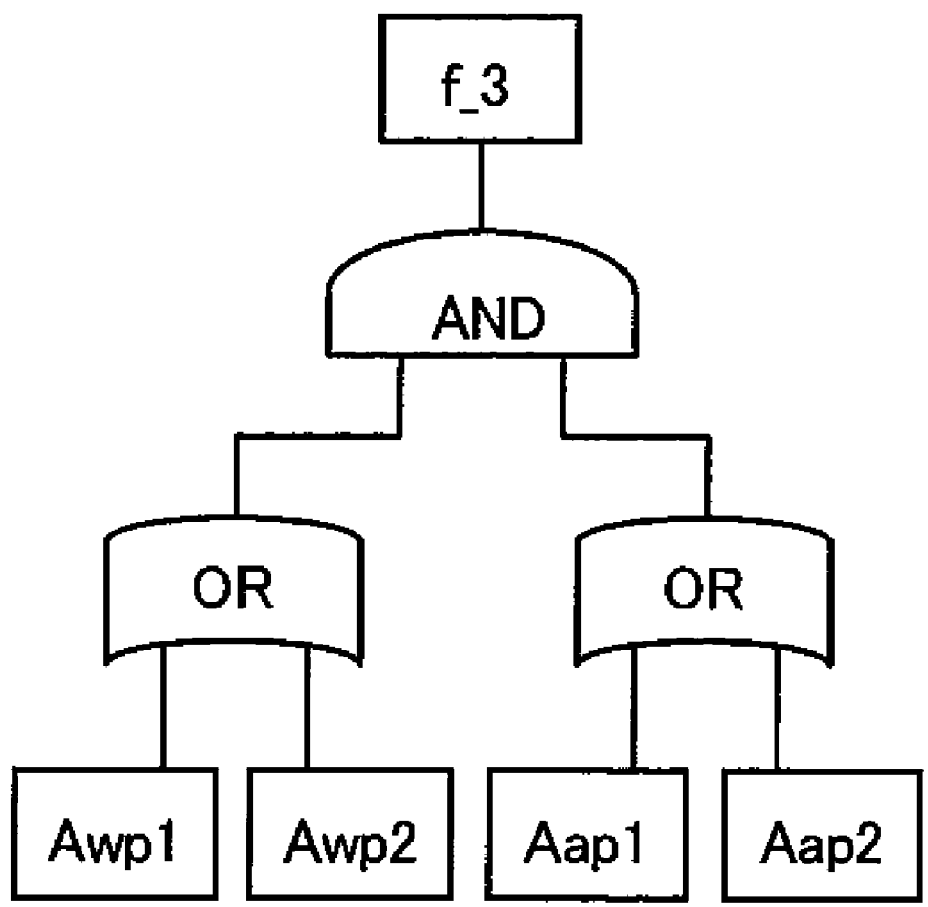
FIG. 19 is a diagram illustrating a minimum intermediate event including Awp2 and Aap1 according to the example of the present invention.

As illustrated in FIG. 18, S3 corresponds to the two basic events Awp2 and Aap1. Therefore, when a minimum intermediate event including these events is searched, f_3= (Awp1 OR Awp2) AND (Aap1 OR Aap2) is obtained.

f_3 is a part of the events corresponding to the top event Asys. However, the items of Alp and Adp are excluded since they are not associated with the basic events Awp2 and Aap1. FIG. 19 illustrates a subtree T3 of the temporary event tree in which f_3 is defined as a root node. When all the basic trees included in this tree are referred, it appears that Awp1 and Aap2 other than Awp2 and Aap1 are included. Accordingly, all the independent sets associated with these basic events are required to be grouped into S3 (steps 3015 to 3017).

Since Awp1 is associated with S2 and Aap2 is associated with S4, S2 and S4 are grouped into S3. As a result, S3={wp1, ws, wp2, ap1, was, ap2, as} is given. All the corresponding basic events are extracted from the regrouped S3 to update E3 (step 3018).

Figure 20:
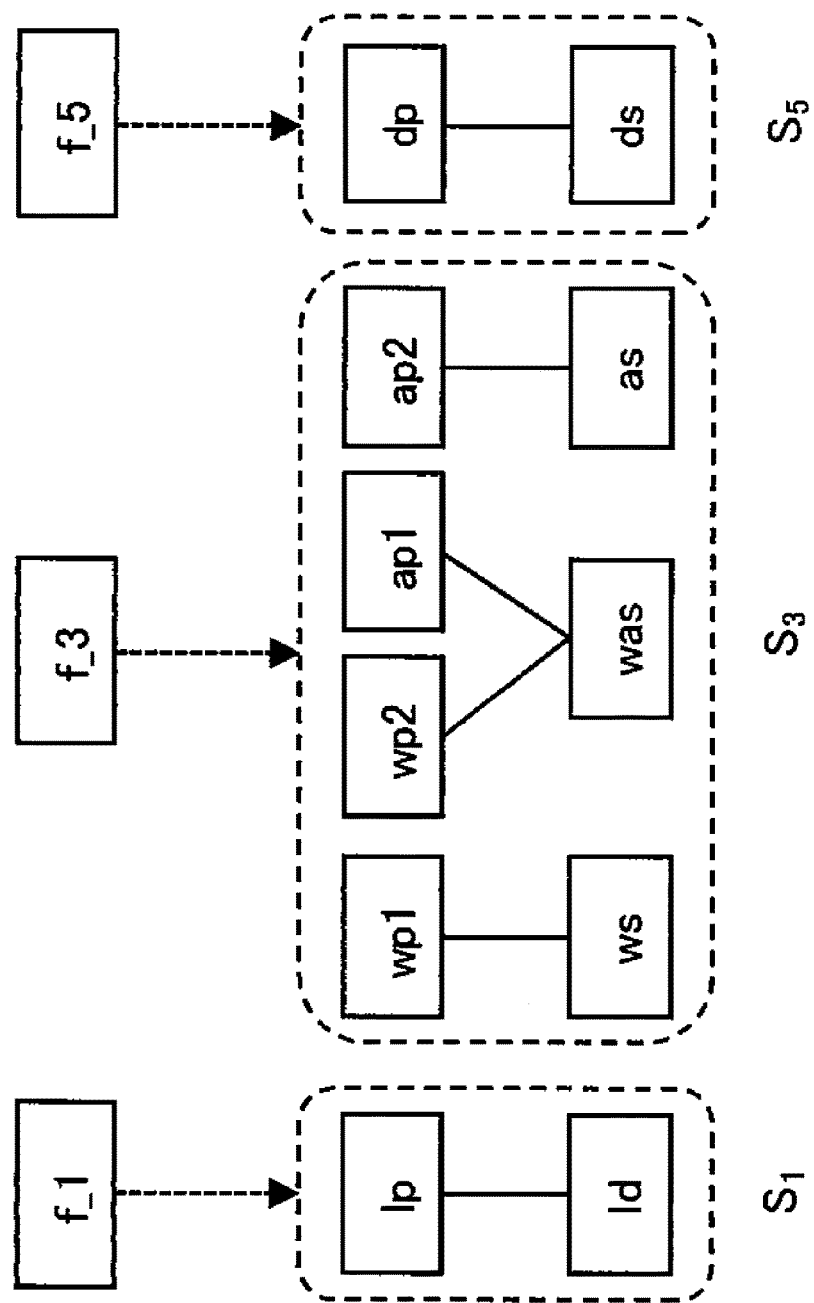
FIG. 20 is a diagram illustrating the correspondence between independent basic events and the sets of the configuration elements of the independent basic events according to the example of the present invention.

The elements of E3 generated at this time are {Awp1, Awp2, Aap1, Aap2}. When a minimum intermediate event is searched from E3, the same result as the above f_3 is obtained. Since f_3 does not include events other than E3, f_3 is finally stored as an independent basic event corresponding to S3. By the above procedure, the dependence between the basic independent events and the sets of the configuration elements of the basic independent events illustrated in FIG. 20 is obtained. However, f_1=Alp, f_3= (Awp1 OR Awp2) AND (Aap1 OR Aap2), and f_5=Adp are given.

Figure 21:
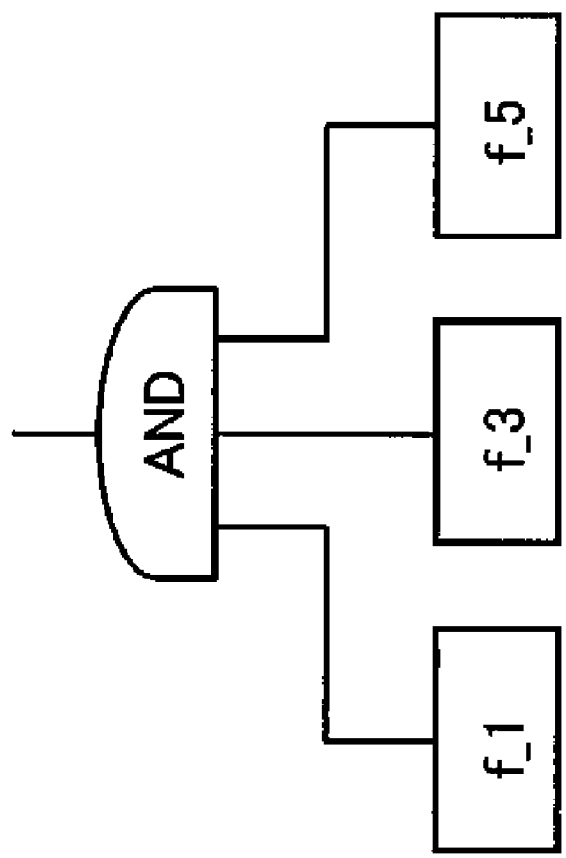
FIG. 21 is a diagram illustrating an event tree according to the example of the present invention.

Using the obtained basic independent events f_1, f_3, and f_5, the temporary event tree is updated to an event tree illustrated in FIG. 21. Finally, state transition models corresponding to the respective independent sets Si are generated according to the operation illustrated in the flowchart of FIG. 8. For example, an example of generating a state transition model for S1 will be described. States in which Ip and Id may be put are expressed as 1 (operate) and 0 (stop). As the pairs m of the states of Ip and Id, the values of (1, 1), (0, 1), and (0, 0) may be taken.

Figure 22:
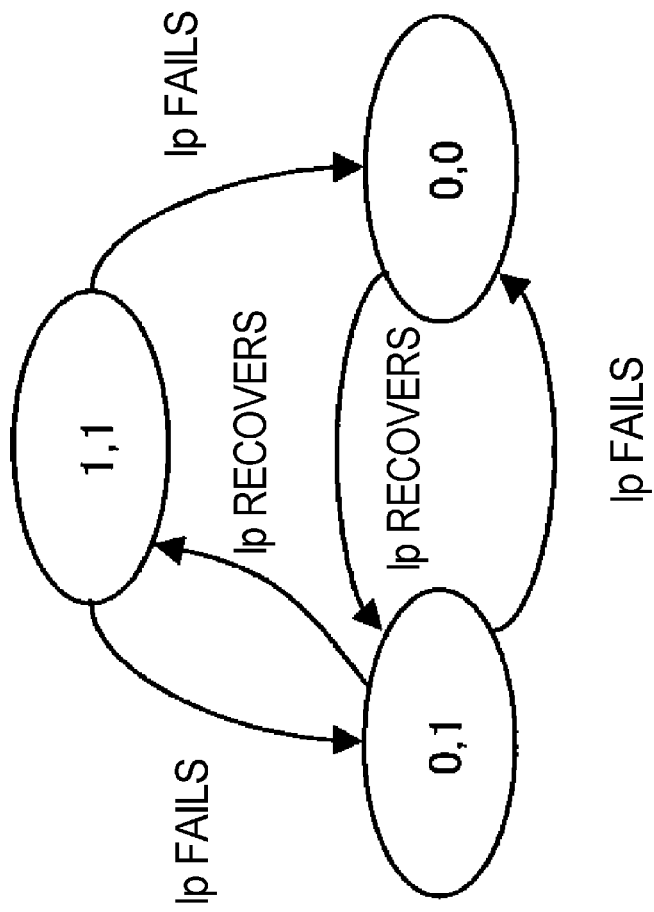
FIG. 22 is a diagram illustrating an example of a continuous-time Markov chain expressing the state transitions of a load balancer according to the example of the present invention.

Here, attention is paid to the fact that (1, 0) does not exist since (1, 0) expresses a state in which the LB process operates and the LB device stops. State transitions about m can be expressed as illustrated in FIG. 22. When average transition time is given to the state transitions such as "Ip fails" and "Ip recovers," this state transition model serves as a continuous-time Markov chain (CTMC).

The CTMC is a model commonly applicable not only to a load balancer but to a sub-system configured by a device and a process. Therefore, a state transition model can be automatically generated by storing in advance the CTMC corresponding to the configuration of the sub-system as a template.

Since the independent basic event corresponding to the LB is f_1=Alp, it appears that f_1 corresponds to the state of (1, 1) in the CTMC of FIG. 18 (the state in which Ip operates). The occurrence probability of f_1 is the probability of the state of (1, 1) in the CTMC, and can be found by the steady-state analysis of the CTMC.

Note that the method for generating the CTMC is described here as a method for generating the state transition model. However, for an element having more complex state transition, a method for generating a model such as Petri Net illustrated in Non-Patent Document 2 or the like can be used.

The respective state transition models are generated for S1, S3, and S5 and stored in the state transition model storage unit 113. By the event tree and the state transition models obtained as described above, a hierarchical probability model is obtained.

This application claims the priority based on Japanese Patent Application No. 2012-108645 filed on May 10, 2012, the entire disclosure of which is incorporated herein.

The present invention is described above with reference to the embodiments but is not limited to them. Various modifications, which may be understood by those skilled in the art, can be made to the configurations and the details of the present invention within the scope of the present invention.

A part or all of the embodiments described above may be described as in the following appendixes but are not limited to them.

(Appendix 1) A hierarchical probability model generation system, including:

an independent event analysis unit that specifies independent events about operating conditions of a system on the basis of availability requirements of the system and configuration information of the system, the independent events being calculable independently of each other;

an event tree generation unit that generates an event tree using the independent events; and a state transition model generation unit that generates state transition models used to calculate occurrence probabilities of the independent events.

(Appendix 2) The hierarchical probability model generation system according to Appendix 1, wherein the independent event analysis unit includes an operating conditions analysis unit that generates a temporary event tree by analyzing the operating conditions of the system from the availability requirements, a dependence analysis unit that extracts independent sets of configuration elements of the system by analyzing dependence between the configuration elements of the system from the configuration information of the system, and an independent event determination unit that determines independent basic events on the basis of the temporary event tree and the independent sets of the configuration elements of the system, the event tree generation unit generates the event tree using the independent basic events, and the state transition model generation unit generates the state transition models used to calculate occurrence probabilities of the independent basic events.

(Appendix 3) A hierarchical probability model generation system, including:

an operating conditions analysis unit that generates a temporary event tree by analyzing operating conditions of a system from availability requirements of the system;

a temporary state transition model generation unit that generates, on the basis of configuration information of the system, temporary state transition models expressing behaviors of configuration elements of the system;

an independent event determination unit that determines independent basic events on the basis of the temporary event tree and the temporary state transition models;

an event tree generation unit that generates an event tree using the independent basic events; and an independent basic event state definition unit that specifies a state on a corresponding state transition model for each of the independent basic events and updates the temporary state transition models.

(Appendix 4) A hierarchical probability model generation method, which includes the steps of:

specifying independent events about operating conditions of a system on the basis of availability requirements of the system and configuration information of the system, the independent events being calculable independently of each other;

generating an event tree using the independent events; and generating state transition models used to calculate occurrence probabilities of the independent events.

(Appendix 5) A hierarchical probability model generation method, which includes the steps of:

generating a temporary event tree by analyzing operating conditions of a system from availability requirements of the system;

generating, on the basis of configuration information of the system, temporary state transition models expressing behaviors of configuration elements of the system;

an independent event determination unit that determines independent basic events on the basis of the temporary event tree and the temporary state transition models;

generating an event tree using the independent basic events; and specifying a state on a corresponding state transition model for each of the independent basic events and updating the temporary state transition models.

(Appendix 6) A program for causing a computer to function as:

an independent event analysis unit that specifies independent events about operating conditions of a system on the basis of availability requirements of the system and configuration information of the system, the independent events being calculable independently of each other;

an event tree generation unit that generates an event tree using the independent events; and a state transition model generation unit that generates state transition models used to calculate occurrence probabilities of the independent events.

(Appendix 7) A program for causing a computer to function as:

an operating conditions analysis unit that generates a temporary event tree by analyzing operating conditions of a system from availability requirements of the system;

a temporary state transition model generation unit that generates, on the basis of configuration information of the system, temporary state transition models expressing behaviors of configuration elements of the system;

an independent event determination unit that determines independent basic events on the basis of the temporary event tree and the temporary state transition models;

an event tree generation unit that generates an event tree using the independent basic events; and an independent basic event state definition unit that specifies a state on a corresponding state transition model for each of the independent basic events and updates the temporary state transition models.

The present invention is suitable to improve the performance and reliability of an availability analysis in a large and complex system.

100 independent event analysis unit
101 availability requirements storage unit
102 unit that stores configuration information of system
103 operating conditions analysis unit
104 temporary event tree storage unit
105 dependence analysis unit
106 unit that stores independent sets of configuration elements of system
107 independent event determination unit
108 independent basic event storage unit
109 unit that stores sets of configuration elements of independent events
110 event tree generation unit
111 event tree storage unit
112 state transition model generation unit
113 state transition model storage unit
114 temporary state transition model generation unit
115 temporary state transition model storage unit
116 independent basic event state definition unit

I claim:

1. A system for generating a hierarchical probability model generation system used for availability analysis, comprising:

a memory storing instructions; and one or more processors configured to execute the instructions to:

generate a temporary event tree by analyzing operating conditions of a multi-tier web application system based on availability requirements of the web application system;

extract independent sets of configuration elements of the web application system by analyzing dependence between the configuration elements based on configuration information of the web application system, wherein the configuration elements correspond to a plurality of functions of the web application system;

determine basic events based on the temporary event tree and the independent sets of the configuration elements, wherein the basic events are inputs of the temporary event tree and include independent and dependent basic events, the independent events being calculable independently of each other, the basic events being associated with operating status of the configuration elements;

specify the independent basic events by extracting the basic events corresponding to the independent sets of the configuration elements;

generate an event tree based on the independent basic events but not the dependent basic events;

generate state transition models used to calculate occurrence probabilities of each of the independent basic events; and evaluate availability of the web application system based on the generated state transition models.

2. The hierarchical probability model generation system according to claim 1, wherein the one or more processors are further configured to execute the instructions to:

generate a dependence graph based on a description expressing dependence between the configuration elements.

3. The hierarchical probability model generation system according to claim 1, wherein the one or more processors are further configured to execute the instructions to:

generate a dependence graph from blocks related to the configuration elements of the web application system, wherein a dependence between the blocks includes an edge.

4. The hierarchical probability model generation system according to claim 1, wherein the one or more processors are further configured to execute the instructions to:

provide a discrete-time simulation for steady-state analysis of the state transition models to calculate the occurrence probabilities of the independent events.

5. The hierarchical probability model generation system according to claim 1, wherein the one or more processors are further configured to execute the instructions to:

calculate a probability in a fault tree; and analyze the event tree in accordance with the calculated probability of the fault tree.

6. The hierarchical probability model generation system according to claim 1, wherein the configuration elements of the web application system correspond to at least one of a load distribution function, a web function, an application function, and a database function.

7. A computer-implemented method for generating a hierarchical probability model used for availability analysis, the method comprising:

generating a temporary event tree by analyzing operating conditions of a multi-tier web application system based on availability requirements of the web application system;

extracting independent sets of configuration elements of the web application system by analyzing dependence between the configuration elements based on configuration information of the web application system, wherein the configuration elements correspond to a plurality of functions of the web application system;

determining basic events based on the temporary event tree and the independent sets of the configuration elements, wherein the basic events are inputs of the temporary event tree and include independent and dependent basic events, the independent events being calculable independently of each other, the basic events being associated with operating status of the configuration elements;

specifying the independent basic events by extracting the basic events corresponding to the independent sets of the configuration elements;

generating, using one or more computer processors, an event tree based on the independent basic events but not the dependent basic events;

generating state transition models used to calculate occurrence probabilities of each of the independent basic events; and evaluating availability of the web application system based on the generated state transition models.

8. The hierarchical probability model generation method according to claim 7, the method further comprising:

generating a dependence graph based on a description expressing dependence between the configuration elements.

9. The hierarchical probability model generation method according to claim 7, the method further comprising:

generating a dependence graph from blocks related to the configuration elements of the web application system, wherein a dependence between the blocks includes an edge.

10. The hierarchical probability model generation method according to claim 7, the method further comprising:

providing a discrete-time simulation for steady-state analysis of the state transition models to calculate the occurrence probabilities of the independent events.

11. The hierarchical probability model generation method according to claim 7, the method further comprising:

calculating a probability in a fault tree; and analyzing the event tree in accordance with the calculated probability of the fault tree.

12. The hierarchical probability model generation method according to claim 7, wherein the configuration elements of the web application system correspond to at least one of a load distribution function, a web function, an application function, and a database function.

13. A non-transitory computer-readable recording medium storing a program that, when executed by a computer, causes the computer to perform a method for generating a hierarchical probability model used for availability analysis, the method comprising:

generating a temporary event tree by analyzing operating conditions of a multi-tier web application system based on availability requirements of the web application system;

extracting independent sets of configuration elements of the web application system by analyzing dependence between the configuration elements based on configuration information of the web application system, wherein the configuration elements correspond to a plurality of functions of the web application system;

determining basic events based on the temporary event tree and the independent sets of the configuration elements, wherein the basic events are inputs of the temporary event tree and include independent and dependent basic events, the independent events being calculable independently of each other, the basic events being associated with operating status of the configuration elements;

specifying the independent basic events by extracting the basic events corresponding to the independent sets of the configuration elements;

generating, using one or more computer processors, an event tree based on the independent basic events but not the dependent basic events;

generating state transition models used to calculate occurrence probabilities of each of the independent basic events; and evaluating availability of the web application system based on the generated state transition models.

14. The non-transitory computer-readable recording medium according to claim 13, the method further comprising:

generating a dependence graph based on a description expressing dependence between the configuration elements.

15. The non-transitory computer-readable recording medium according to claim 13, the method further comprising:

generating a dependence graph from blocks related to the configuration elements of the web application system, wherein a dependence between the blocks includes an edge.

16. The non-transitory computer-readable recording medium according to claim 13, the method further comprising:

providing a discrete-time simulation for steady-state analysis of the state transition models to calculate the occurrence probabilities of the independent events.

17. A system for generating a hierarchical probability model used for availability analysis, comprising:

a memory storing instructions; and one or more processors configured to execute the instructions to:

generate a temporary event tree by analyzing operating conditions of a multi-tier web application system based on availability requirements of the web application system;

generate, based on configuration information of the web application system, temporary state transition models expressing behaviors of configuration elements of the web application system corresponding to basic events, wherein the configuration elements correspond to a plurality of functions of the web application system, the basic events being associated with operating status of the configuration elements;

extract independent basic events based on the temporary event tree and the temporary state transition models, wherein the basic events are inputs of the temporary event tree and include the independent and dependent basic events, the independent basic events being calculable independently of each other;

generate an event tree based on the independent basic events but not the dependent basic events;

update the temporary state transition models used to calculate occurrence probabilities of each of the independent basic events; and evaluate availability of the web application system based on the updated temporary state transition models.

18. A computer-implemented method for generating a hierarchical probability model used for availability analysis, the method comprising:

generating, using one or more computer processors, a temporary event tree by analyzing operating conditions of a multi-tier web application system based on from availability requirements of the web application system;

generating, based on configuration information of the web application system, temporary state transition models expressing behaviors of configuration elements of the web application system corresponding to basic events, wherein the configuration elements correspond to a plurality of functions of the web application system, the basic events being associated with operating status of the configuration elements;

extracting independent basic events based on the temporary event tree and the temporary state transition models, wherein the basic events are inputs of the temporary event tree and include the independent and dependent basic events, the independent basic events being calculable independently of each other;

generating an event tree based on the independent basic events but not the dependent basic events;

updating the temporary state transition models used to calculate occurrence probabilities of each of the independent basic events; and evaluating availability of the web application system based on the updated temporary state transition models.

19. A non-transitory computer-readable recording medium storing a program that, when executed by a computer, causes the computer to perform a method for generating a hierarchical probability model used for availability analysis, the method comprising:

generating, using one or more computer processors, a temporary event tree by analyzing operating conditions of a multi-tier web application system based on from availability requirements of the web application system;

generating, based on configuration information of the web application system, temporary state transition models expressing behaviors of configuration elements of the web application system corresponding to basic events, wherein the configuration elements correspond to a plurality of functions of the web application system, the basic events being associated with operating status of the configuration elements;

extracting independent basic events based on the temporary event tree and the temporary state transition models, wherein the basic events are inputs of the temporary event tree and include the independent and dependent basic events, the independent basic events being calculable independently of each other;

generating an event tree based on the independent basic events but not the dependent basic events;

updating the temporary state transition models used to calculate occurrence probabilities of each of the independent basic events; and evaluating availability of the web application system based on the updated temporary state transition models.

* * * * *